United States Patent
Ahn et al.

(10) Patent No.: US 11,665,662 B2
(45) Date of Patent: May 30, 2023

(54) METHOD FOR ONBOARDING IN MULTIPLE ACCESS POINT NETWORK AND ACCESS POINT USING SAME

(71) Applicant: WILUS INSTITUTE OF STANDARDS AND TECHNOLOGY INC., Gyeonggi-do (KR)

(72) Inventors: Woojin Ahn, Gyeonggi-do (KR); Juhyung Son, Gyeonggi-do (KR); Jinsam Kwak, Gyeonggi-do (KR)

(73) Assignee: WILUS INSTITUTE OF STANDARDS AND TECHNOLOGY INC., Gyeonggi-Do (KR)

( * ) Notice: Subject to any disclaimer, the term of this patent is extended or adjusted under 35 U.S.C. 154(b) by 86 days.

(21) Appl. No.: 17/285,469

(22) PCT Filed: Oct. 17, 2019

(86) PCT No.: PCT/KR2019/013660
§ 371 (c)(1),
(2) Date: Apr. 14, 2021

(87) PCT Pub. No.: WO2020/080850
PCT Pub. Date: Apr. 23, 2020

(65) Prior Publication Data
US 2021/0385778 A1    Dec. 9, 2021

(30) Foreign Application Priority Data

Oct. 17, 2018  (KR) .................. 10-2018-0123718
Nov. 27, 2018  (KR) .................. 10-2018-0148975

(51) Int. Cl.
*H04W 60/00*   (2009.01)
*H04W 48/08*   (2009.01)

(52) U.S. Cl.
CPC .......... *H04W 60/00* (2013.01); *H04W 48/08* (2013.01)

(58) Field of Classification Search
CPC ..... H04W 12/06; H04W 48/08; H04W 60/00; H04W 84/12; H04W 88/08; H04W 92/20
See application file for complete search history.

(56) References Cited

U.S. PATENT DOCUMENTS 11,388,590 B2 *  7/2022  Jiang .................. H04W 12/037
11,409,896 B2 *  8/2022  Nix ....................... H04W 12/06
(Continued)

FOREIGN PATENT DOCUMENTS

KR   10-2016-0121546   10/2016
KR   10-2017-0137617   12/2017
WO   2018/075135       4/2018

OTHER PUBLICATIONS

International Search Report for PCT/KR2019/013660 dated Feb. 14, 2020 and its English translation from WIPO (now published as WO 2020/080850).

(Continued)

*Primary Examiner* — Khawar Iqbal
(74) *Attorney, Agent, or Firm* — Ladas & Parry, LLP

(57) ABSTRACT

Disclosed is an access point, which is a registrant desiring to register with a multiple access point network. A wireless communication terminal comprises: a transmitting and receiving unit for transmitting and receiving a wireless signal; and a processor for processing the wireless signal. The processor receives a first device provisioning protocol (DPP) message from a controller of the multiple access point network when the access point is onboarding to the multiple access point network by using a DPP, obtains, from the first DPP message, information on a channel on which the DPP is performed, and transmits a second DPP message to the (Continued)

controller in the channel indicated by the information on the channel.

15 Claims, 18 Drawing Sheets

(56) References Cited

U.S. PATENT DOCUMENTS

| | | | | |
|---|---|---|---|---|
| 2017/0257819 | A1* | 9/2017 | McCann | H04W 48/14 |
| 2018/0109381 | A1* | 4/2018 | Cammarota | H04L 9/0819 |
| 2018/0109418 | A1* | 4/2018 | Cammarota | H04W 12/50 |
| 2019/0306710 | A1* | 10/2019 | Cammarota | H04W 84/12 |
| 2021/0194681 | A1* | 6/2021 | Nix | H04L 41/0809 |
| 2021/0211959 | A1* | 7/2021 | Nakagawa | H04W 36/10 |
| 2021/0243825 | A1* | 8/2021 | Takada | H04W 76/12 |
| 2021/0306860 | A1* | 9/2021 | Suzuki | H04L 9/3247 |
| 2021/0329462 | A1* | 10/2021 | Bernsen | H04L 9/30 |
| 2022/0150721 | A1* | 5/2022 | Zebulon | H04L 1/0001 |
| 2022/0376904 | A1* | 11/2022 | Nix | H04L 9/0861 |

OTHER PUBLICATIONS

Written Opinion of the International Searching Authority for PCT/KR2019/013660 dated Feb. 14, 2020 and its English translation by Google Translate (now published as WO 2020/080850).

\* cited by examiner

| | Frame Control (Type: Action) | Duration | RA | TA | BSSID | Sequence Control | HT Control | Frame Body | FCS |
|---|---|---|---|---|---|---|---|---|---|
| Octets | 2 | 2 | 6 | 6 | 6 | 2 | 0 or 4 | Variable | 4 |

(a)

| Field | Value | Description |
|---|---|---|
| Category | 0x04 | Public Action |
| Action field | 0x09 | Vendor Specific |
| OUI | 50 6F 9A | WFA OUI |
| OUI Type | 0x1A | DPP v1.0 |
| Crypto Suite | | |
| DPP frame type | 0: Authentication Request<br>1: Authentication Response<br>2: Authentication Confirm | DPP action frame |
| Attributes | | |

(b)

| Attributes | Components |
|---|---|
| Responder Bootstrapping Key Hash | |
| Initiator Bootstrapping Key Hash | |
| Initiator Protocol Key | |
| Wrapped Data | Initiator Nonce, Initiator Capabilities |
| Multi-AP Extension | Configurator Identification, Backhaul BSS operating channel, Event type |

(c)

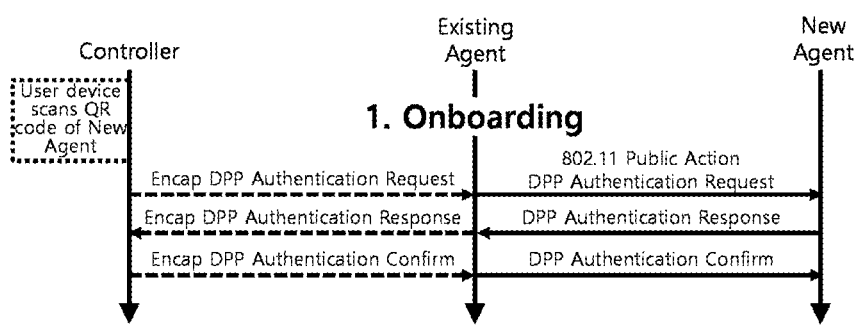

1905 MAP R2 DPP TLV format

| Field | Length | Value | Description |
|---|---|---|---|
| tlvType | 1 octet | 0xA0 | Encap DPP TLV. |
| tlvLength | 2 octets | Variable | Number of octets in ensuing field. |
| tlvValue | Bit 7 | 0 or 1 | Forwarding (Final destination) |
| | Bit 6 | 0 or 1 | Class-and-channels control bit |
| | Bit 5-0 | 0 | Reserved. |
| | 6 octet | Variable | STA MAC address. (if Bit 7 =1) |
| | 1 octet | Variable | DPP public action frame type |
| | Variable | Variable | DPP public action frame |
| | 1 octet | K | Number of Class-and-channels . (if Bit 6 =1) |
| | 1 octet | Variable | Operating Class |
| | 1 octet | M | Number of channels for this class. |
| | 1 octet | Variable | Channel Number. |
| | The above field is repeated m-1 times | | |
| | The above three fields are repeated k-1 times | | |

*FIG. 12*

| Parameter | Name | Type | Value |
|---|---|---|---|
| DPP Configuration Attributes object | configAttrib | OBJECT | |
| Device Name | name | STRING | |
| Wi-Fi Technology | wi-fi_tech | STRING | infra |
| Network Role | netRole | STRING | MAP backhaul STA |

(a)

| Parameter | Name | Type | Value |
|---|---|---|---|
| DPP Configuration object | ConfigurationObject | OBJECT | |
| Wi-Fi Technology | wi-fi_tech | STRING | infra |
| Service | svc | STRING | |
| Discovery object: | Discovery | OBJECT | |
| SSID | ssid | STRING | backhaul SSID |
| Credential object | cred | OBJECT | |
| AKM | akm | STRING | psk+sae+dpp |
| Pre-shared key | Pds_hex | STRING | Pre-shared key encoded in hex. |
| WPA2 Passphrase and/or SAE password | Pass | STRING | PSK or SAE Passphrase/password |
| DPP connector | signedConnector | STRING | |
| C-sign-key | Csign | JWK | |

(b)

| Parameter | Name | Type | Value |
|---|---|---|---|
| DPP Connector Body object | dppCon | OBJECT | |
| | groups | ARRAY | |
| | groupid | STRING | backhaul |
| | netRole | STRING | MAP backhaul STA |
| | netAccessKey | JWK | |
| | expiry | STRING | |

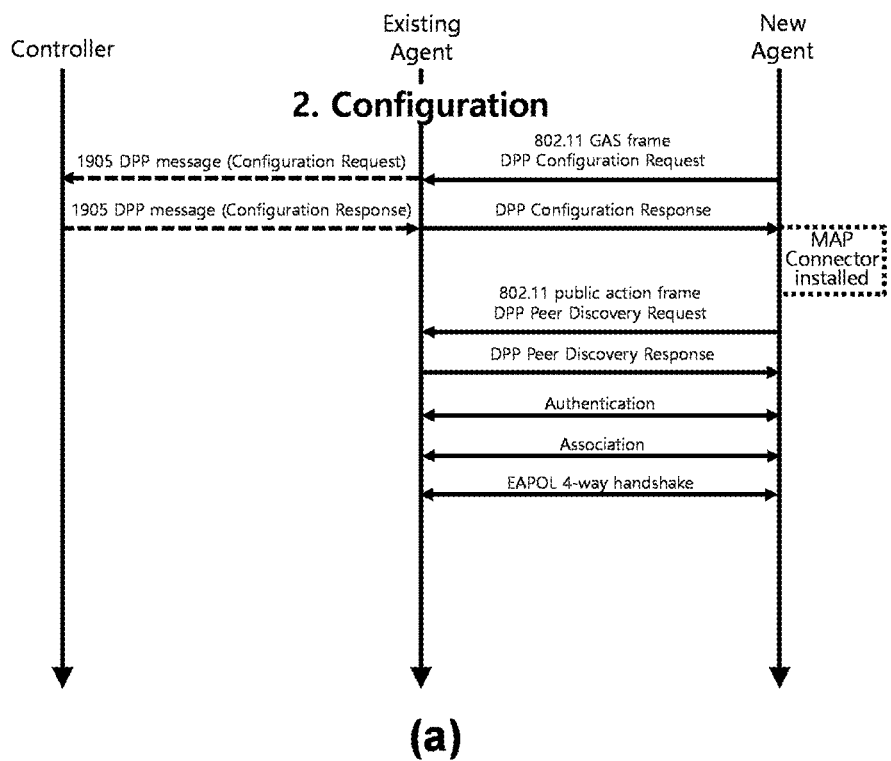
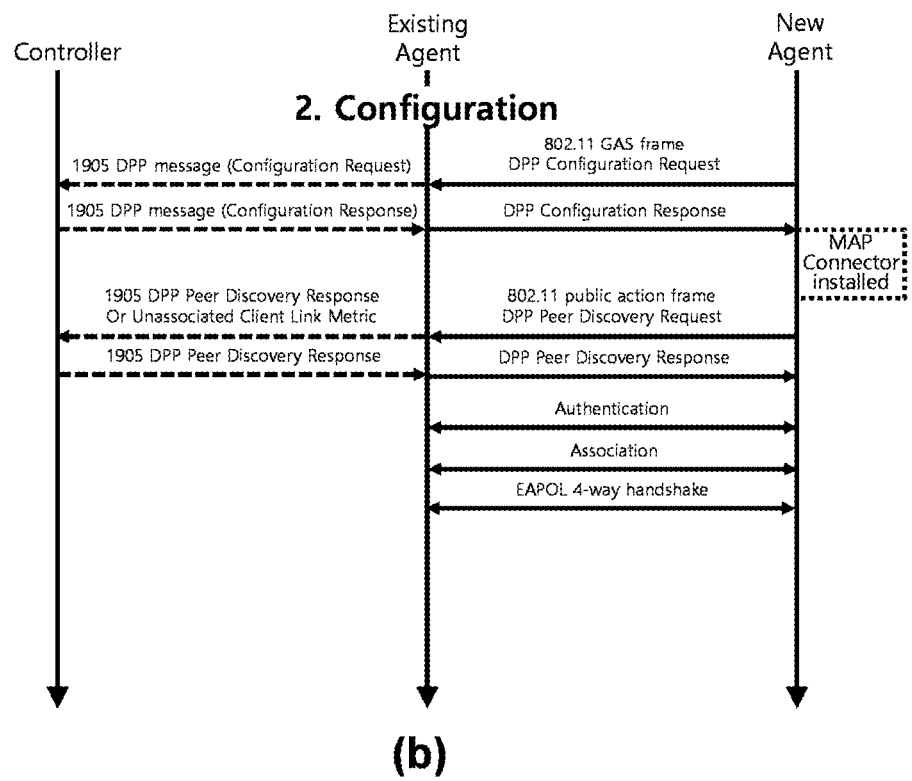
FIG. 14

| Parameter | Name | Type | Value |
|---|---|---|---|
| DPP Configuration Attributes object | configAttrib | OBJECT | |
| Device Name | name | STRING | |
| Wi-Fi Technology | wi-fi_tech | STRING | MAP |
| Network Role | netRole | STRING | MAP Agent |

(a)

| Parameter | Name | Type | Value |
|---|---|---|---|
| DPP Configuration object | Configuration Object | OBJECT | |
| Wi-Fi Technology | wi-fi_tech | STRING | MAP |
| Service | svc | STRING | |
| Discovery object: | Discovery | OBJECT | |
| SSID | ssid | STRING | nil |
| Credential object | cred | OBJECT | |
| AKM | akm | STRING | dpp |
| DPP connector | signedConnector | STRING | |
| C-sign-key | Csign | JWK | |

(b)

| Parameter | Name | Type | Value |
|---|---|---|---|
| DPP Connector Body object | dppCon | OBJECT | |
| | groups | ARRAY | |
| | groupid | STRING | MAP |
| | netRole | STRING | MAP Agent |
| | netAccessKey | JWK | |
| | expiry | STRING | |

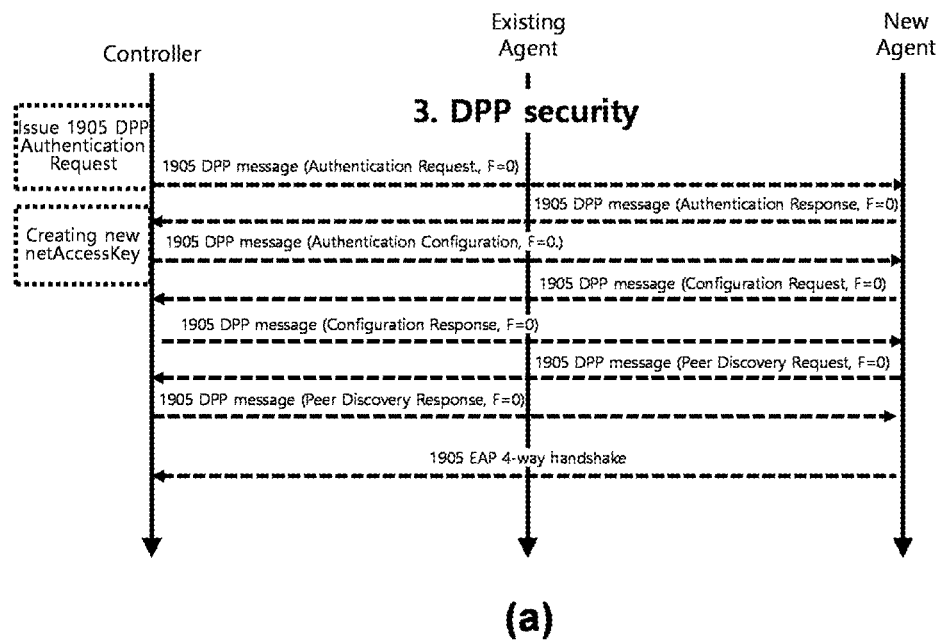
(a)
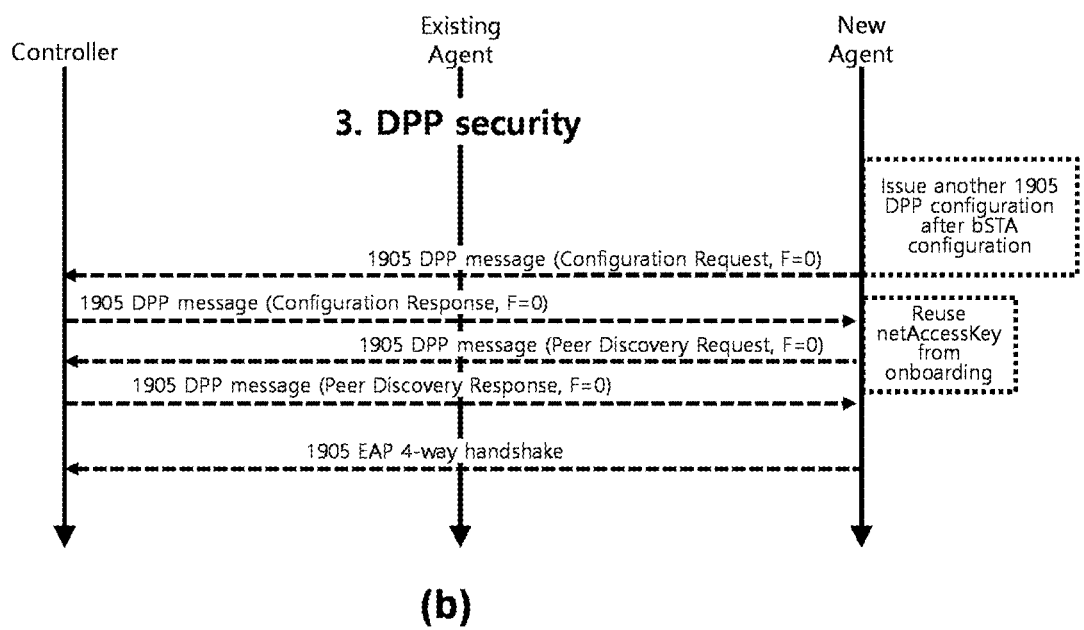
(b)
FIG. 16

| Parameter | Name | Type | Value |
|---|---|---|---|
| DPP Configuration Attributes object | configAttrib | OBJECT | |
| Device Name | name | STRING | |
| Wi-Fi Technology | wi-fi_tech | STRING | infra |
| Network Role | netRole | STRING | MAP backhaul AP |

(a)

| Parameter | Name | Type | Value |
|---|---|---|---|
| DPP Configuration object | ConfigurationObject | OBJECT | |
| Wi-Fi Technology | wi-fi_tech | STRING | infra |
| Service | svc | STRING | |
| Discovery object: | Discovery | OBJECT | |
| SSID | ssid | STRING | backhaul SSID |
| Credential object | cred | OBJECT | |
| AKM | akm | STRING | Psk+sae+dpp |
| Pre-shared key | Pds_hex | STRING | Pre-shared key encoded in hex. |
| WPA2 Passphrase and/or SAE password | Pass | STRING | PSK or SAE Passphrase/password |
| DPP connector | signedConnector | STRING | |
| C-sign-key | Csign | JWK | |

(b)

| Parameter | Name | Type | Value |
|---|---|---|---|
| DPP Connector Body object | dppCon | OBJECT | |
| | groups | ARRAY | |
| | groupid | STRING | Backhaul |
| | netRole | STRING | MAP backhaul AP |
| | netAccessKey | JWK | |
| | expiry | STRING | |

| Parameter | Name | Type | Value |
|---|---|---|---|
| DPP Configuration Attributes object | configAttrib | OBJECT | |
| Device Name | name | STRING | |
| Wi-Fi Technology | wi-fi_tech | STRING | infra |
| Network Role | netRole | STRING | MAP fronthaul AP |

(a)

| Parameter | Name | Type | Value |
|---|---|---|---|
| DPP Configuration object | ConfigurationObject | OBJECT | |
| Wi-Fi Technology | wi-fi_tech | STRING | infra |
| Service | svc | STRING | |
| Discovery object: | Discovery | OBJECT | |
| SSID | ssid | STRING | fronthaul SSID |
| Credential object | cred | OBJECT | |
| AKM | akm | STRING | Psk+sae+dpp |
| Pre-shared key | Pds_hex | STRING | Pre-shared key encoded in hex. |
| WPA2 Passphrase and/or SAE password | Pass | STRING | PSK or SAE Passphrase/password |
| DPP connector | signedConnector | STRING | |
| C-sign-key | Csign | JWK | |

(b)

| Parameter | Name | Type | Value |
|---|---|---|---|
| DPP Connector Body object | dppCon | OBJECT | |
| | groups | ARRAY | |
| | groupid | STRING | Fronthaul |
| | netRole | STRING | MAP fronthaul AP |
| | netAccessKey | JWK | |
| | expiry | STRING | |

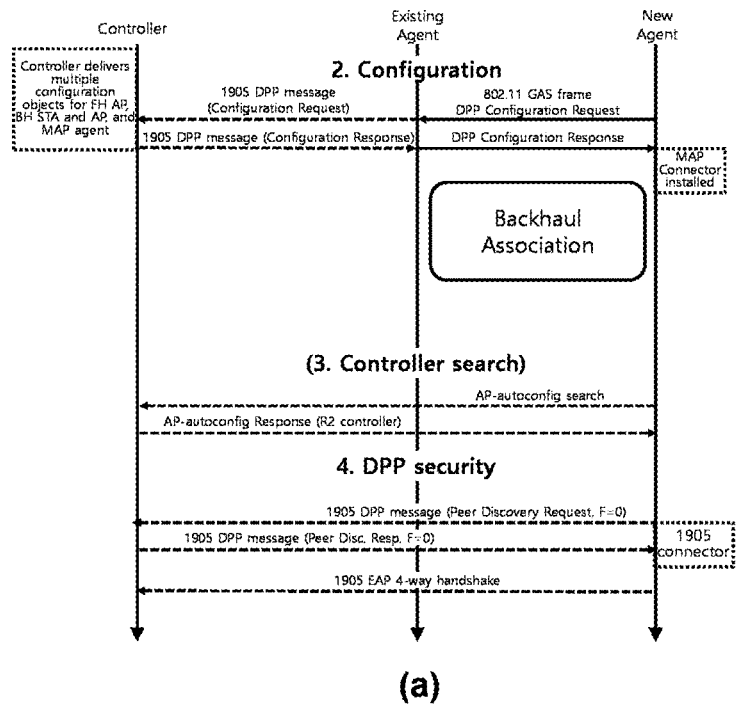
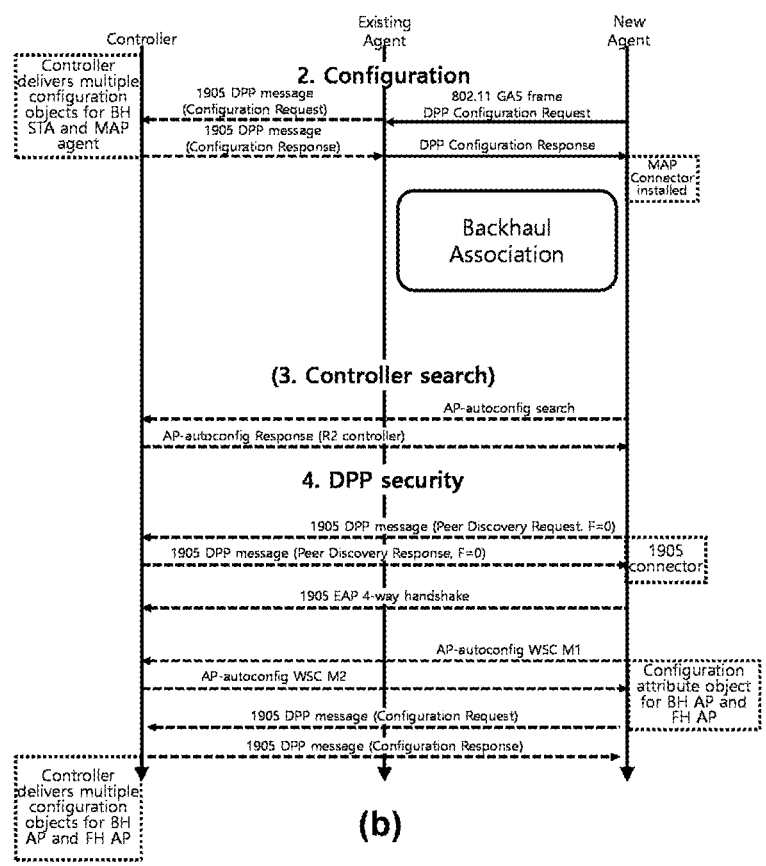
*FIG. 19*

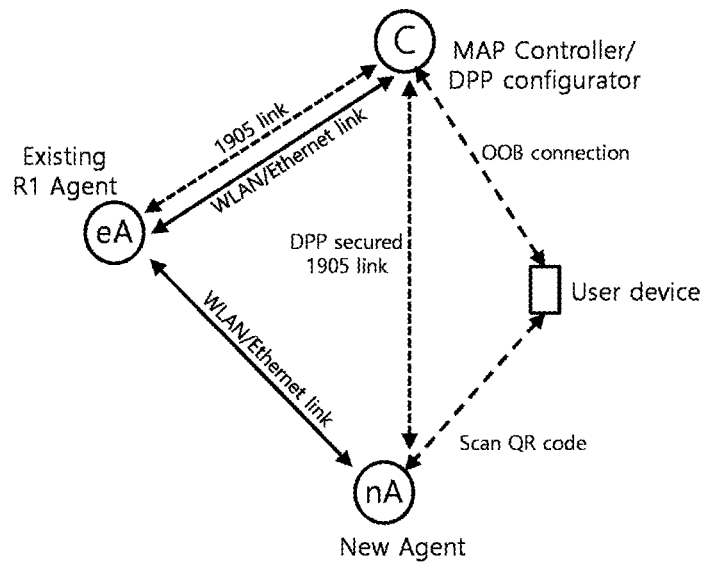
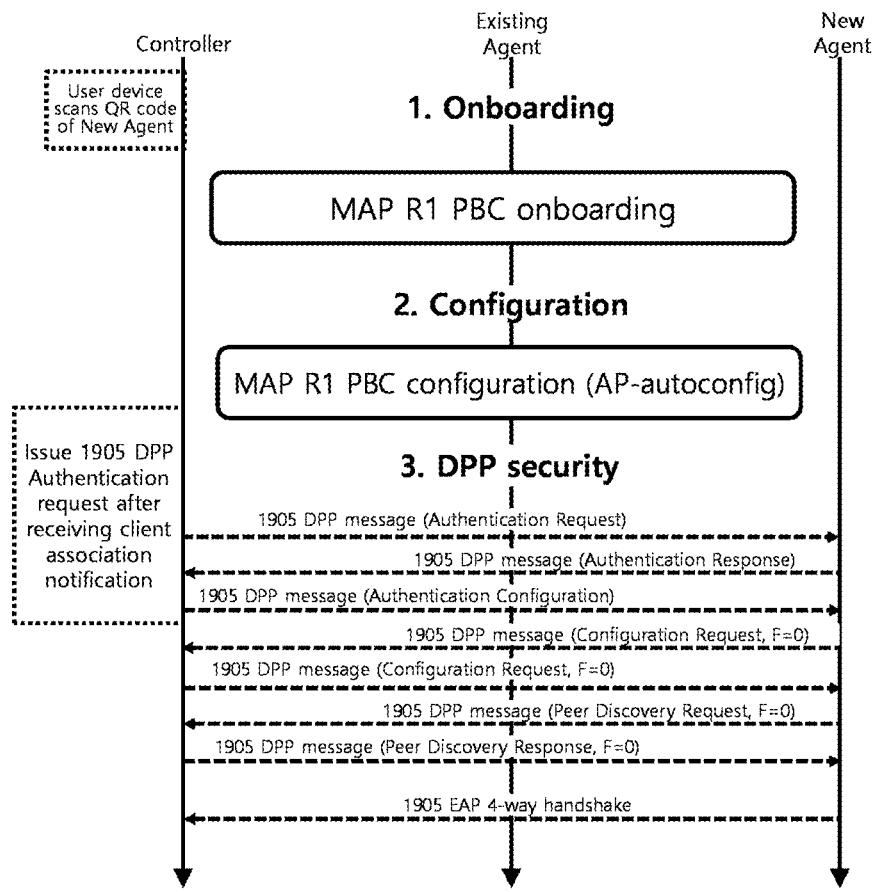
FIG. 20

METHOD FOR ONBOARDING IN MULTIPLE ACCESS POINT NETWORK AND ACCESS POINT USING SAME

CROSS-REFERENCE TO RELATED APPLICATIONS

This application is the U.S. National Stage of pending PCT International Application No. PCT/KR2019/013660, which was filed on Oct. 17, 2019, and which claims priority under 35 U.S.C 119(a) to Korean Patent Application No. 10-2018-0123718 filed with the Korean Intellectual Property Office on Oct. 17, 2018, and Korean Patent Application No. 10-2018-0148975 filed with the Korean Intellectual Property Office on Nov. 27, 2018. The disclosures of the above patent applications are incorporated herein by reference in their entirety.

TECHNICAL FIELD

The present disclosure relates to a method for onboarding in a multiple access point network and an access point using the same.

BACKGROUND ART

With the wide spread of mobile devices in recent years, a wireless local area network (LAN) technology capable of providing fast wireless Internet service to mobile devices has been significantly spotlighted. The Wireless LAN technology is a technology that enables mobile devices such as smartphones, smart pads, laptop computers, portable multimedia players, embedded devices, or the like, to access the Internet wirelessly at home, business, or in a specific service provision area based on wireless communication technology in a short distance.

Institute of Electrical and Electronics Engineers (IEEE) 802.11 has been commercializing or developing various technology standards since the initial wireless LAN technology is supported using 2.4 GHz frequency. First, IEEE 802.11b uses frequencies of a 2.4 GHz band to support a communication speed of a maximum of 11 Mbps. IEEE 802.11a which is commercialized after the IEEE 802.11b uses frequencies of a 5 GHz band, instead of the 2.4 GHz band, to reduce an influence by interference as compared with the frequencies of the 2.4 GHz band which are quite congested and improve the communication speed up to a maximum of 54 Mbps by using an Orthogonal Frequency Division Multiplexing (OFDM) technology. However, the IEEE 802.11a has a disadvantage in that a communication distance is shorter than the IEEE 802.11b. In addition, IEEE 802.11g significantly comes into the spotlight by using the frequencies of the 2.4 GHz band similarly to the IEEE 802.11b to implement the communication speed of a maximum of 54 Mbps and satisfying backward compatibility, and even in terms of the communication distance, IEEE 802.11g is superior to the IEEE 802.11a.

Moreover, as a technology standard established to overcome a limitation of the communication speed which has been pointed out as a vulnerability in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and, further, is based on a multiple inputs and multiple outputs (MIMO) technology in which multiple antennas are used at both a transmitting unit and a receiving unit in order to minimize a transmission error and optimize a data speed. Further, the standard may use a coding scheme in which multiple copies overlapping with each other are transmitted in order to increase data reliability.

As the wireless LAN is widely spread and applications using the wireless LAN are diversified, new wireless LAN systems for supporting a higher throughput (very high throughput (VHT)) than the data processing speed supported by the IEEE 802.11n have been demanded. Among them, IEEE 802.11ac supports a wide bandwidth (80 MHz to 160 MHz) in the 5 GHz frequencies. The IEEE 802.11ac standard is defined only in the 5 GHz band; however, initial 11ac chipsets will support even operations in the 2.4 GHz band for the backward compatibility with the existing 2.4 GHz band products. Theoretically, according to the standard, wireless LAN speeds of multiple stations may be up to a minimum of 1 Gbps and a maximum single link speed may be up to a minimum of 500 Mbps. This is achieved by extending concepts of a wireless interface accepted by 802.11n, such as a wider wireless bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard in which a speed of a maximum of 7 Gbps is provided by using a beamforming technology and is suitable for high bitrate moving picture streaming such as massive data or non-compression HD video. However, the 60 GHz frequency band is difficult to pass through an obstacle, and thus may be used only among devices in a short-distance space, which may be disadvantageous.

Meanwhile, in recent years, in order to provide a high-efficiency and high-performance wireless communication technology in a high-density environment as next-generation wireless communication technology standards after the 802.11ac and 802.11ad, discussions have been continuously made. That is, in a next-generation wireless LAN environment, communication with high frequency efficiency is to be provided indoors/outdoors under the presence of a high-density station and an access point (AP), and various technologies for implementing the communication have been developed.

In the case of a wireless LAN, since multiple terminals form a network with one AP, it is likely that communication coverage is narrow and a shadow area occurs in the same space depending on the position of the AP. In order to solve the above problems, a technology for increasing communication coverage by installing a plurality of APs constituting the same network is being discussed mainly by the Wi-Fi Alliance.

DISCLOSURE OF THE INVENTION

Technical Problem

An object of an embodiment of the present disclosure is to provide a method for onboarding in a multiple access point network and an access point using the same.

Technical Solution

According to an embodiment of the present disclosure, an access point that is an enrollee attempting to enroll in a multiple access point network includes a transmit/receive unit and a processor. The processor is configured to receive a first device provisioning protocol (DPP) message from a controller of the multiple access point network, obtain information on a channel on which a DPP is performed from the first DPP message, and transmits a second DPP message to the controller on a channel indicated by the information on a channel, when the access point onboards to the multiple access point network by using the DPP.

The first DPP message may include information on a plurality of channels on which the DPP is performed.

The first DPP message may include final destination information indicating whether the first DPP message is to be forwarded to the enrollee or directly transferred to the enrollee.

The first DPP message may include a medium access control (MAC) address of the enrollee when the final destination information indicates that the first DPP message is to be forwarded to the enrollee.

A security process for the DPP to establish a secured link between the controller and the enrollee may be initiated by the controller when the enrollee onboards to the multiple access point network without using the security process for the DPP and the controller holds information on a bootstrap public key of the enrollee.

According to an embodiment of the present disclosure, an access point that is a controller configured to control a multiple access point network includes a transmit/receive unit and a processor. The processor is configured to insert information on a channel on which a DPP is performed into a first DPP message when an enrollee attempting to enroll in the multiple access point network onboards to the multiple access point network by using the DPP, transmit the first DPP message to the enrollee, and receive a second DPP message from the enrollee on a channel indicated by the information on a channel.

The first DPP message may include information on a plurality of channels on which the DPP is performed.

The first DPP message may include final destination information indicating whether the first DPP message is to be forwarded to the enrollee or directly transferred to the enrollee.

The first DPP message may include a medium access control (MAC) address of the enrollee when the final destination information indicates that the first DPP message is to be forwarded to the enrollee.

The processor may be configured to initiate a security process for the DPP to establish a secured link between the controller and the enrollee when the enrollee onboards to the multiple access point network without using the security process for the DPP and the controller holds information on a bootstrap public key of the enrollee.

According to an embodiment of the present disclosure, there is provided an operation method of an access point that is an enrollee attempting to enroll in a multiple access point network, the operation method including receiving a first DPP message from a controller of the multiple access point network when the access point onboards to the multiple access point network by using the DPP, obtaining information on a channel on which a DPP is performed from the first DPP message, and transmitting a second DPP message to the controller on a channel indicated by the information on a channel.

The first DPP message may include information on a plurality of channels on which the DPP is performed.

The first DPP message may include final destination information indicating whether the first DPP message is to be forwarded to the enrollee or directly transferred to the enrollee.

The first DPP message may include a medium access control (MAC) address of the enrollee when the final destination information indicates that the DPP message is to be forwarded to the enrollee.

A security process for the DPP to establish a secured link between the controller and the enrollee may be initiated by the controller when the enrollee onboards to the multiple access point network without using the security process for the DPP and the controller holds information on a bootstrap public key of the enrollee.

According to an embodiment of the present disclosure, an operation method of an access point that is a controller configured to control a multiple access point network, the operation method includes inserting information on a channel on which a DPP is performed into a first DPP message when an enrollee attempting to enroll in the multiple access point network onboards to the multiple access point network by using the DPP, transmitting the first DPP message to the enrollee, and receiving a second DPP message from the enrollee on a channel indicated by the information on a channel.

The first DPP message may include information on a plurality of channels on which the DPP is performed.

The first DPP message may include final destination information indicating whether the first DPP message is to be forwarded to the enrollee or directly transferred to the enrollee.

The first DPP message may include a medium access control (MAC) address of the enrollee when the final destination information indicates that the first DPP message is to be forwarded to the enrollee.

The operation method may further include initiating a security process for the DPP to establish a secured link between the controller and the enrollee when the enrollee onboards to the multiple access point network without using the security process for the DPP and the controller holds information on a bootstrap public key of the enrollee.

Advantageous Effects

An embodiment of the present disclosure provides a method for onboarding in a multiple access point network and an access point using the same.

BRIEF DESCRIPTION OF THE DRAWINGS

FIG. 11 shows a format of a frame used for a DPP authentication, information included in the frame, and an onboarding process using the DPP authentication, according to an embodiment of the present disclosure.

FIG. 12 shows a type-length-value (TLV) format of a DPP message according to an embodiment of the present disclosure.

FIG. 13 shows a configuration object and a connector used in a configuration process for a MAP controller and an enrollee to proceed through a MAP agent, according to an embodiment of the present disclosure.

FIG. 14 shows the configuration process for the MAP controller and the enrollee to proceed through the MAP agent, according to an embodiment of the present disclosure.

FIG. 15 shows a format of a DPP configuration message used by a MAP controller in an end-to-end DPP security process with the enrollee, according to an embodiment of the present disclosure.

FIG. 16 shows an end-to-end DPP security process with an enrollee by a MAP controller, according to an embodiment of the present disclosure.

FIG. 17 shows a configuration object exchanged between the MAP controller and the enrollee such that the enrollee operates as a backhaul AP, according to an embodiment of the present disclosure.

FIG. 18 shows a configuration object exchanged between the MAP controller and the enrollee such that the enrollee operates as a fronthaul AP, according to an embodiment of the present disclosure.

FIG. 19 shows a DPP security method using a message encapsulated in a 1905 format according to another embodiment of the present disclosure.

FIG. 20 shows that an enrollee proceeds with a DPP configuration with a MAP controller supporting the DPP when the MAP agent connected to the enrollee does not support the DPP, according to an embodiment of the present disclosure.

MODE FOR CARRYING OUT THE INVENTION

Figure 1:
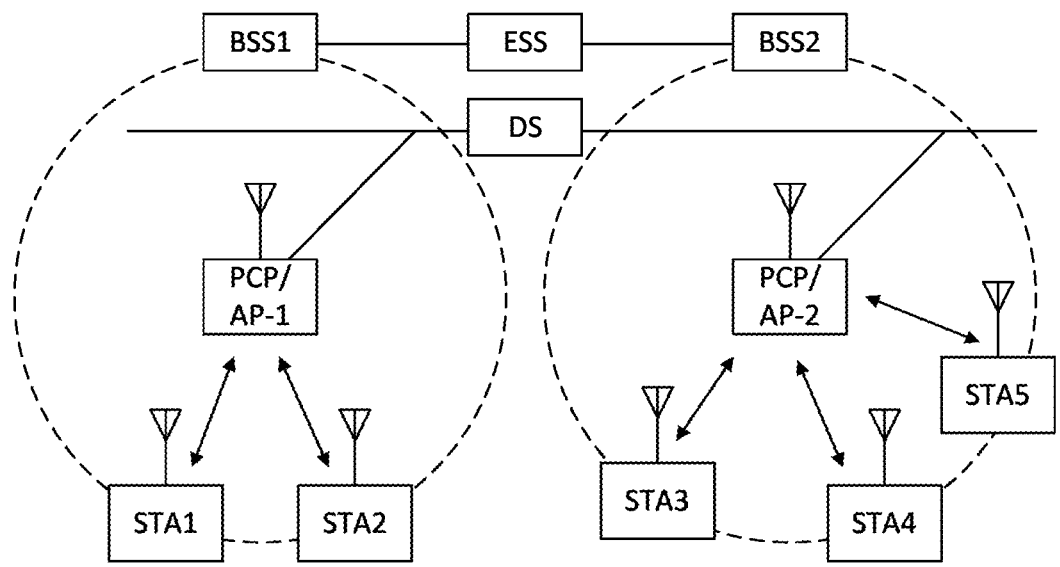
FIG. 1 shows a wireless LAN system according to an embodiment of the present disclosure.

Hereinafter, embodiments of the present disclosure will be described in detail with reference to the accompanying drawings so that those skilled in the art may easily perform the present disclosure. However, the present disclosure may be implemented by various modifications and is not limited to the embodiments described herein. In the drawings, in order to clarify the present disclosure, parts that are not related to description are omitted and like reference numerals represent like elements throughout the specification.

In addition, when a part "includes" an element, unless described to the contrary, the term "includes" does not indicate that another element is excluded but instead indicates that the other element may be further included.

FIG. 1 shows a wireless LAN system according to an embodiment of the present disclosure. The wireless LAN system includes one or more basic service sets (BSSs), and the BSS represents a set of devices that are successfully synchronized with each other to communicate with each other. In general, the BSS may be classified into an infrastructure BSS and an independent BSS (IBSS), and FIG. 1 illustrates the infrastructure BSS between them.

As shown in FIG. 1, the infrastructure BSSs BSS1 and BSS2 include one or more stations STA1, STA2, STA3, STA4, and STA5, access points PCP/AP-1 and PCP/AP-2 which are stations providing a distribution service, and a distribution system (DS) connecting the multiple access points PCP/AP-1 and PCP/AP-2.

The station STA is a predetermined device including medium access control (MAC) in accordance with a regulation of an IEEE 802.11 standard and a physical layer interface for a wireless medium, and includes both a non-access point (non-AP) station and an access point (AP) in a broad sense. Further, in the present specification, the term 'terminal' may be used as a concept including all wireless LAN communication devices such as the station and the AP. A station for wireless communication includes a processor and a transmit/receive unit and according to the embodiment, may further include a user interface unit, a display unit, or the like. The processor may generate a frame to be transmitted through a wireless network or process a frame received through the wireless network and besides, perform various processes for controlling the station. In addition, the transmit/receive unit is functionally connected with the processor and transmits and receives frames through the wireless network for the station.

The access point (AP) is an entity that provides access to the distribution system (DS) via a wireless medium for the station associated therewith. In the infrastructure BSS, communication among non-AP stations is, in principle, performed via the AP, but when a direct link is configured, direct communication is enabled even among the non-AP stations. Meanwhile, in the present disclosure, the AP is used as a concept including a personal BSS coordination point (PCP) and may include concepts including a centralized controller, a base station (BS), a node-B, a base transceiver system (BTS), a site controller, or the like in a broad sense.

A plurality of infrastructure BSSs may be connected with each other through the distribution system (DS). In this case, a plurality of BSSs connected through the distribution system is referred to as an extended service set (ESS).

Figure 2:
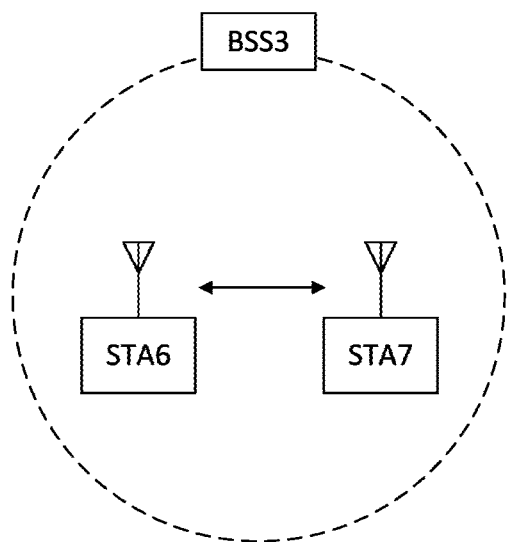
FIG. 2 shows a wireless LAN system according to another embodiment of the present disclosure.

FIG. 2 shows an independent BBS, which is a wireless LAN system according to another embodiment of the present disclosure. In the embodiment of FIG. 2, descriptions of parts that are the same as or correspond to the embodiment of FIG. 1 will not be repeated.

Since a BSS3 illustrated in FIG. 2 is the independent BSS and does not include the AP, all stations STA6 and STAT are not connected with the AP. The independent BSS is not permitted to access the distribution system and forms a self-contained network. In the independent BSS, the stations STA6 and STAT may be directly connected with each other.

Figure 3:
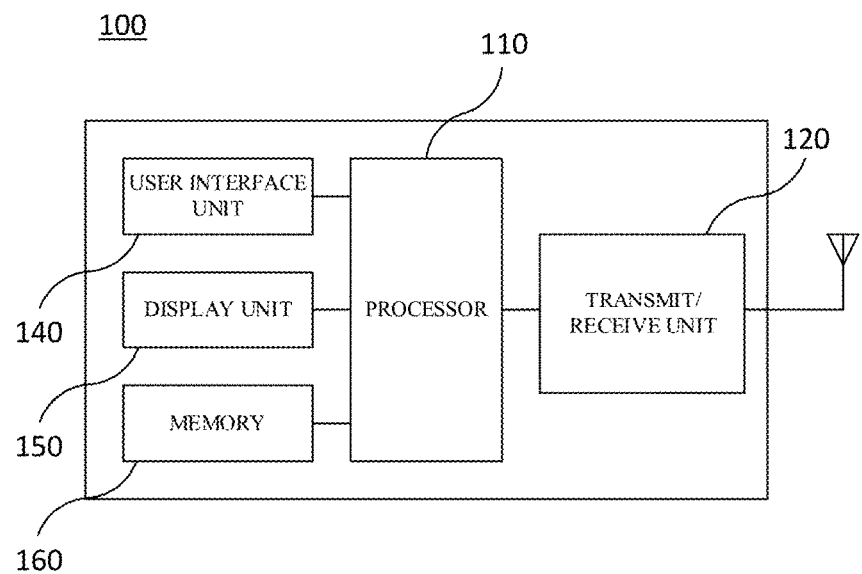
FIG. 3 is a block diagram illustrating a configuration of a station according to an embodiment of the present disclosure.

FIG. 3 is a block diagram illustrating configuration of a station 100 according to an embodiment of the present disclosure.

As illustrated in FIG. 3, the station 100 according to the embodiment of the present disclosure may include a processor 110, a transmit/receive unit 120, a user interface unit 140, a display unit 150, and a memory 160.

First, the transmit/receive unit 120 may transmit and receive a wireless signal such as a wireless LAN physical layer frame, or the like, and may be embedded in the station 100 or externally provided. According to the embodiment, the transmit/receive unit 120 may include at least one transmit/receive module using different frequency bands. For example, the transmit/receive unit 120 may include transmit/receive modules having different frequency bands such as 2.4 GHz, 5 GHz, and 60 GHz. According to an embodiment, the station 100 may include a transmit/receive module using a frequency band of 6 GHz or more and a transmit/receive module using a frequency band of 6 GHz or less. Each transmit/receive module may perform wireless communication with the AP or an external station according to a wireless LAN standard of a frequency band supported by the transmit/receive module. The transmit/receive unit 120 may operate only one transmit/receive module at a time or simultaneously operate multiple transmit/receive modules together depending on the performance and requirements of the station 100. When the station 100 includes a plurality of transmit/receive modules, each transmit/receive module may be implemented in an independent form or a plurality of modules may be integrated into one chip.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present disclosure may execute various commands or programs and process data in the station 100. Further, the processor 110 may control the respective units of the station 100 and control data transmission/reception among the units. According to the embodiment of the present disclosure, the processor 110 may execute the program for accessing the AP stored in the memory 160 and may receive a communication configuration message transmitted by the AP. Further, the processor 110 may read information on a priority condition of the station 100 included in the communication configuration message and request the access to the AP based on the information on the priority condition of the station 100. The processor 110 of the present disclosure may refer to a main control unit of the station 100 and according to the embodiment, the processor 110 may refer to a control unit for individually controlling some component of the station 100, for example, the transmit/receive unit 120, and the like. The processor 110 may be a modulator and/or demodulator which modulates and/or demodulates wireless signals transmitted to and/or received from the transmit/receive unit 120. The processor 110 controls various operations of wireless signal transmission/reception of the station 100 according to the embodiment of the present disclosure. A detailed embodiment thereof will be described below.

The station 100 illustrated in FIG. 3 is presented as a block diagram according to an embodiment of the present disclosure, where separate blocks are illustrated as logically distinguished elements of the device. Accordingly, the elements of the device may be mounted as a single chip or multiple chips depending on design of the device. For example, the processor 110 and the transmit/receive unit 120 may be implemented as a single integrated chip or implemented as a separate chip. Further, in the embodiment of the present disclosure, some components of the station 100, for example, the user interface unit 140 and the display unit 150 may be optionally provided in the station 100.

Figure 4:
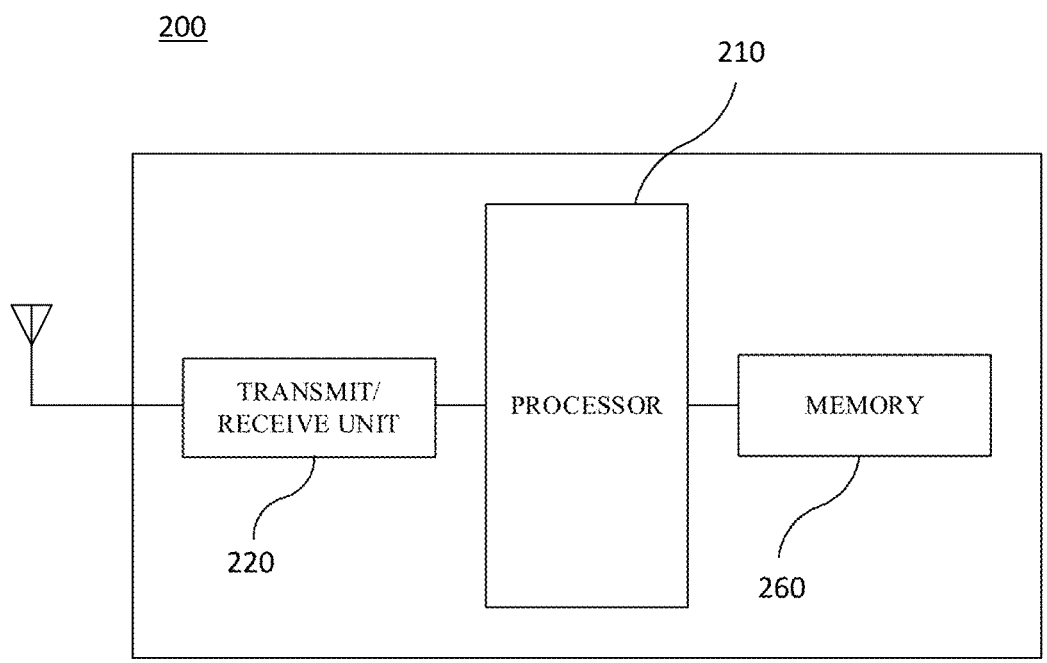
FIG. 4 is a block diagram illustrating a configuration of an access point according to an embodiment of the present disclosure.

FIG. 4 is a block diagram illustrating a configuration of an AP 200 according to an embodiment of the present disclosure.

As illustrated in FIG. 4, the AP 200 according to the embodiment of the present disclosure may include a processor 210, a transmit/receive unit 220, and a memory 260. In FIG. 4, among the components of the AP 200, descriptions of parts which are the same as or correspond to the components of the station 100 of FIG. 2 will not be repeated.

Referring to FIG. 4, the AP 200 according to the present disclosure includes the transmit/receive unit 220 for operating the BSS in at least one frequency band. As described in the embodiment of FIG. 3, the transmit/receive unit 220 of the AP 200 may also include a plurality of transmit/receive modules using different frequency bands. That is, the AP 200 according to the embodiment of the present disclosure may include two or more transmit/receive modules of different frequency bands, for example, of 2.4 GHz, 5 GHz, and 60 GHz together. Preferably, the AP 200 may include a transmit/receive module using a frequency band of 6 GHz or more and a transmit/receive module using a frequency band of 6 GHz or less. Each transmit/receive module may perform wireless communication with the station according to a wireless LAN standard of a frequency band supported by the transmit/receive module. The transmit/receive unit 220 may operate only one transmit/receive module at a time or simultaneously operate multiple transmit/receive modules together depending on the performance and requirements of the AP 200.

Next, the memory 260 stores a control program used in the AP 200 and various resulting data. The control program may include an access program for managing the access of the station. Further, the processor 210 may control each of units of the AP 200 and control data transmission/reception among the units. According to the embodiment of the present disclosure, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. According to an embodiment, the processor 210 may be a modulator and/or demodulator which modulates and/or demodulates wireless signals transmitted to and/or received from the transmit/receive unit 220. The processor 210 controls various operations of wireless signal transmission/reception of the AP 200 according to the embodiment of the present disclosure. A detailed embodiment thereof will be described below.

Figure 5:
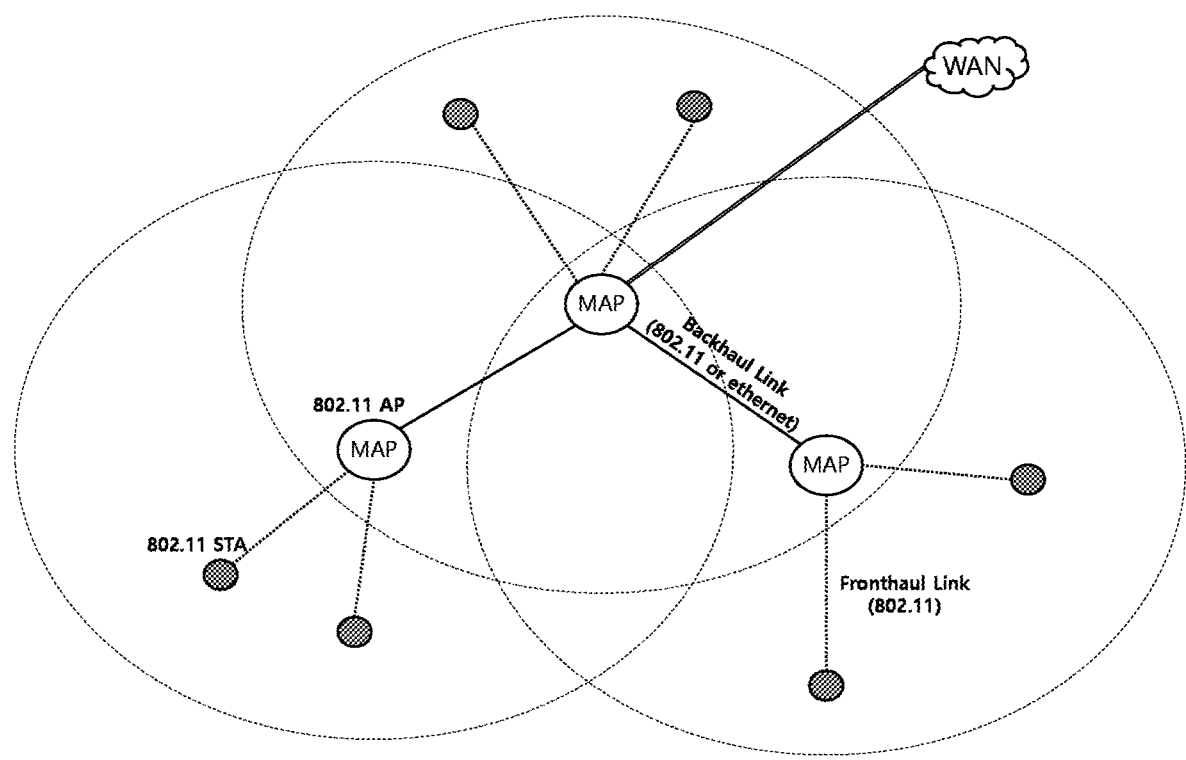
FIG. 5 shows a multiple access point network.

FIG. 5 shows a multiple access point network.

A multi-access point (Multi-AP, MAP) network is configured around one access point (AP) and may include a plurality of BSSs. In this case, the plurality of BSSs may overlap each other. The plurality of BSSs are connected through a backhaul link, and communication with other BSSs may be performed through the backhaul link. The backhaul link may be formed through wireless LAN or Ethernet. The access point that operates the BSS of the MAP network is referred to as a MAP device. Even if the MAP device is not connected to the external network (WAN), if the MAP device and another MAP device connected through the backhaul link are connected to the external network, the MAP device may be connected to the external network through another MAP device connected to the external network.

The MAP device may include a plurality of RF modules capable of operating at the same time. Therefore, the MAP device may operate a plurality of BSSs at the same time. Therefore, the MAP device may operate a fronthaul BSS that may be accessed by non-AP STAs such as smartphones and laptops and operate a backhaul BSS that may be accessed by MAP devices of the same MAP network. Each of the MAP devices in the MAP network may use a different value as the basic service set ID (BSSID) of the fronthaul BSS, and may use the same value as the SSID of the fronthaul BSS. In addition, each of the MAP devices in the MAP network may use the same access security scheme. Therefore, the non-AP station may recognize the MAP network as one wireless LAN profile.

Figure 6:
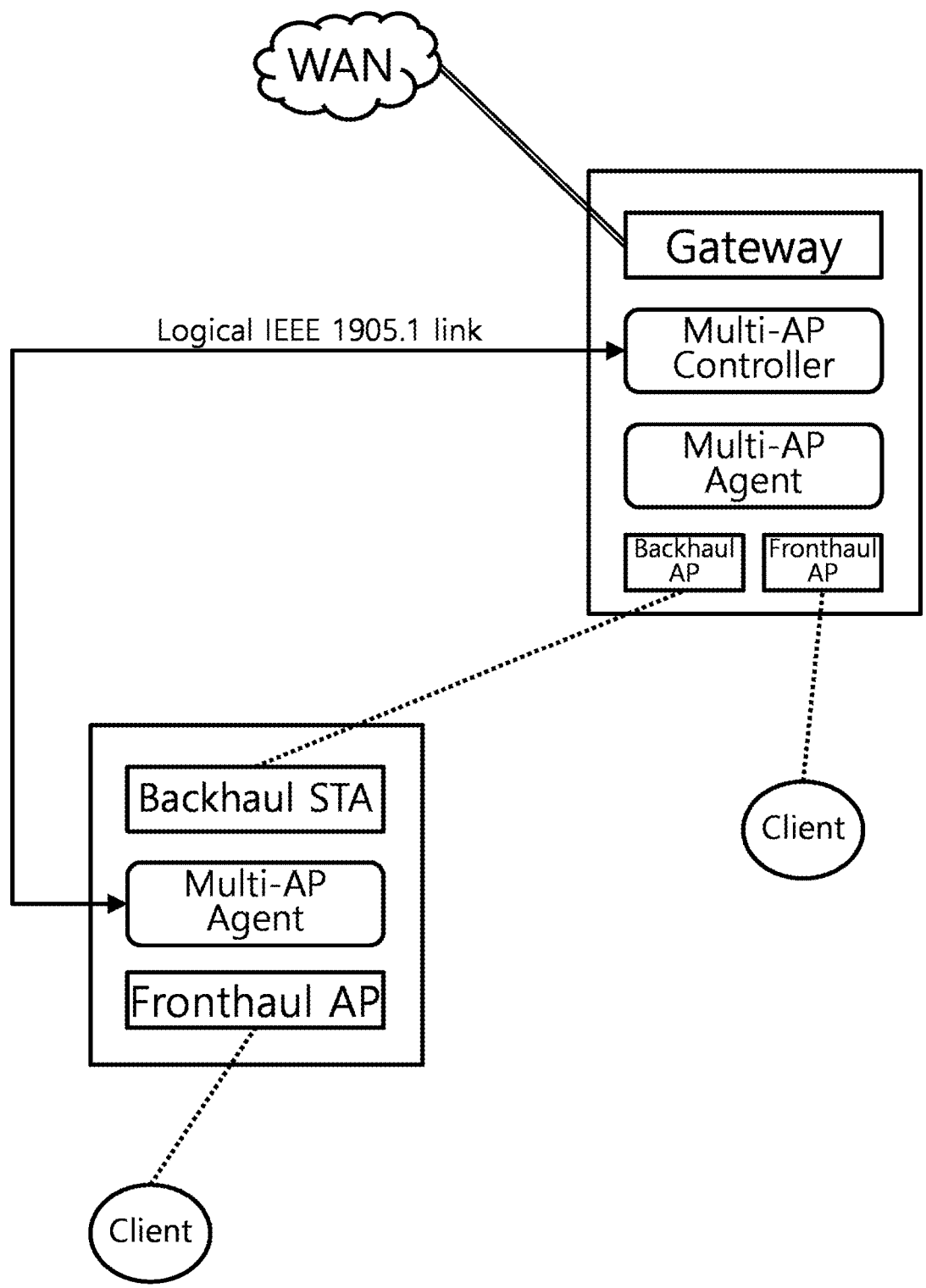
FIG. 6 shows a logical structure of a multiple access point device according to an embodiment of the present disclosure.

FIG. 6 shows a logical structure of a multiple access point device according to an embodiment of the present disclosure.

The MAP network may provide a function beyond signal amplification or packet forwarding provided by an existing wireless LAN repeater or extender. Specifically, the MAP network may provide a function to increase MAP network efficiency by synthesizing various information on the MAP network. For example, when the coverage between MAP devices overlaps, the MAP network may induce the fronthaul BSS to use a channel with less interference or high efficiency between the MAP devices.

In addition, when a new MAP device attempts to enroll in the MAP network, an existing MAP device connected to the MAP network may configure a backhaul link with the new MAP device. In this case, the existing MAP device may configure a backhaul link with the new MAP device in a reliable manner without receiving a user's input of separate information related to security. Specifically, the existing MAP device may transfer information required for MAP network configuration to the new MAP device through the backhaul link. Information required for configuring the MAP network may include at least one of an SSID and a certificate(credential). The connection of a new MAP device to the MAP network is referred to as onboarding. In addition, a new MAP device attempting to enroll in the MAP network may be referred to as an enrollee. In addition, when the non-AP station associated with the MAP network moves, the MAP network may induce roaming to the MAP device with which the non-AP station is to be associated, in consideration of at least one of channel conversion and the load of the BSS.

In order for the MAP network to perform this operation, the MAP network may include one MAP controller and one or more MAP agents. The MAP controller and MAP agent are logical entities. Therefore, one MAP device may include only a MAP controller. Furthermore, one MAP device may include only a MAP agent. In addition, one MAP device may include both a MAP controller and a MAP agent. The MAP controller controls the fronthaul AP and the backhaul link in the MAP network. In addition, the MAP controller may receive measurement values and capability data for the fronthaul AP, a client, and the backhaul link from the MAP agent. In addition, the MAP controller may provide an onboarding function for onboarding and provisioning the MAP device to the MAP network. The MAP controller may request that the MAP agent transmits information related to the MAP agent. In addition, the MAP controller may cause the MAP agent to perform commands related to a specific BSS or a specific client. The MAP agent executes commands received from the MAP controller. In addition, the MAP agent may report measurement values and capability data for the fronthaul AP, the client, and the backhaul link to the MAP controller or another MAP agent.

The IEEE 802.11 wireless LAN standard does not define the transmission of information within the BSS to more than 1-hop devices. Therefore, the MAP controller and the MAP agent may transmit and receive information by using the abstraction layer (AL) messaging protocol defined in the IEEE 1905.1 standard. For convenience of description, a message transmitted by using the AL message protocol defined in the IEEE 1905.1 standard is referred to as a message transmitted in the 1905.1 format. The AL is a layer between layer 2 (medium access control (MAC) layer) and layer 3 (internet protocol (IP) layer). The AL is defined for routing and messaging within a multihop network composed of heterogeneous links such as wireless LAN, Ethernet, and physical layer convergence (PLC). A message transmitted by the MAP controller in the 1905.1 format may be transferred to a plurality of MAP agents in a multiple hop distance. Through this, information included in the 1905.1 format message may be transferred to the MAC layer of a specific BSS. Since the MAP agent knows the WAN access point in the MAP network, the MAP agent may transfer a wireless LAN packet transferred by the client to the MAP through 1905.1 format message routing to the WAN access point.

In FIG. 6, a gateway includes the MAP controller and the MAP agent. The gateway is connected to the client through the fronthaul BSS, and is connected to another MAP device in the MAP network through the backhaul link. The other MAP device includes a MAP agent and are connected to the client through a fronthaul BSS. As described above, the other MAP device communicates with the gateway through the 1905.1 format message, and may transmit the wireless LAN packet to the WAN through the gateway.

When a new MAP device, that is, an enrollee, onboards to the MAP network, the enrollee may onboard through a Wi-Fi simple configuration (WSC) method defined by the Wi-Fi Alliance. Specifically, the MAP device may perform onboarding using a push button configuration (PBC) method of the WSC. This will be described with reference to FIG. 7.

Figure 7:
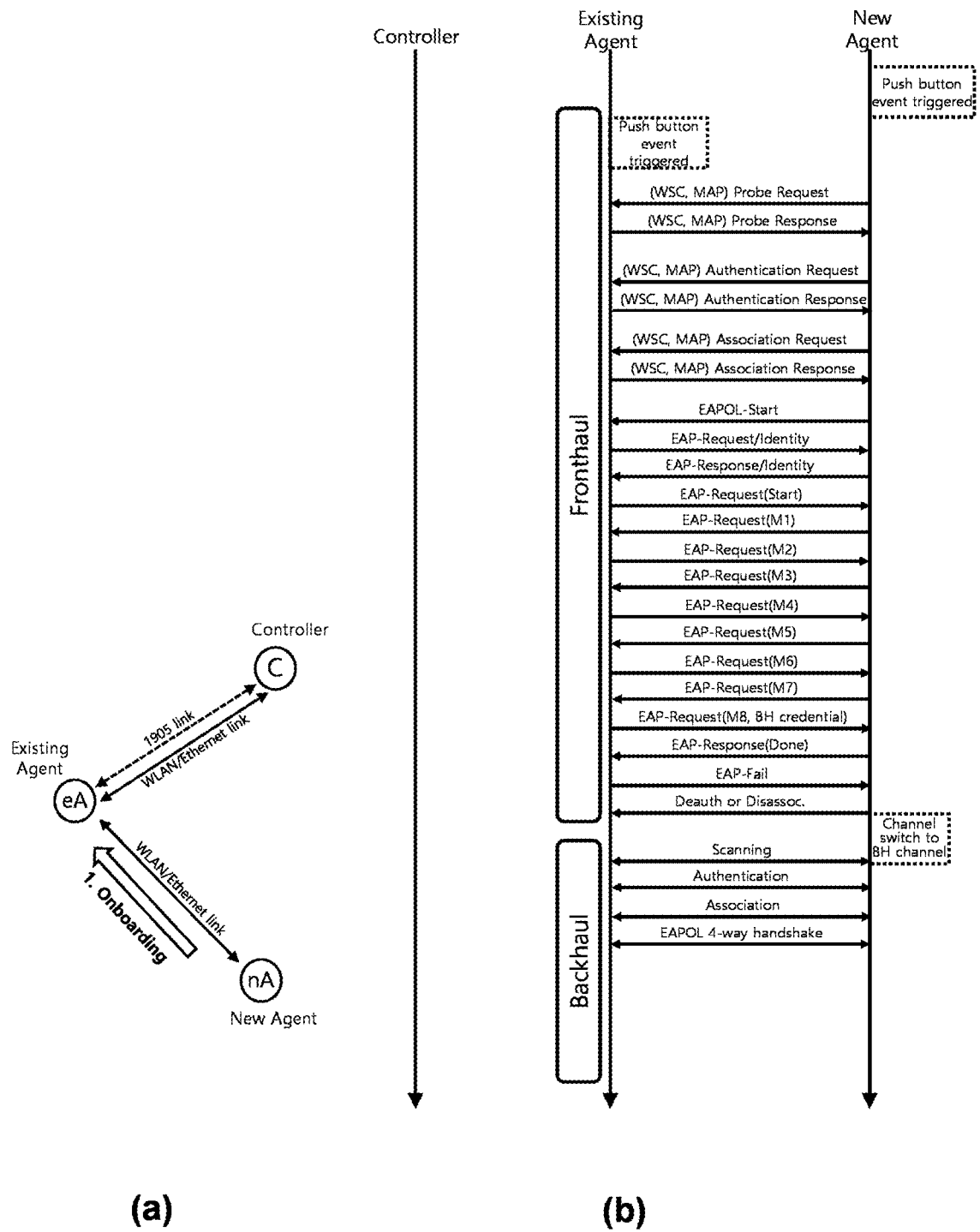
FIG. 7 shows a push-button onboarding according to an embodiment of the present disclosure.

FIG. 7 shows a push-button onboarding according to an embodiment of the present disclosure.

FIG. 7(a) shows a connection relationship of a MAP device (New Agent) nA, that is, an enrollee, attempting to enroll in a MAP network, an existing MAP agent that has enrolled in the MAP network (Existing Agent) eA, and a MAP controller C of the MAP network. The enrollee nA and the existing MAP agent eA are connected through a wireless LAN or Ethernet link, and the existing MAP agent eA is connected to the MAP controller through the wireless LAN or Ethernet link. In addition, the existing MAP agent eA transmits and receives messages related to onboarding to and from the MAP controller through a link configured through the IEEE 1905.1 protocol. In the following description, reference to IEEE 1905 or 1905 indicates the IEEE 1905.1 protocol. The PBC scheme-based onboarding process will be described in detail with reference to FIG. 7(b).

FIG. 7(b) shows the PBC scheme-based onboarding process according to an embodiment of the present disclosure. The MAP device (New Agent), that is, the enrollee, attempting to enroll in the MAP network starts the WSC process when a PBC event occurs. In this case, the PBC event may be generated by a hardware button input or by an input using a user application.

The MAP device may perform transmission by including a WSC information element (IE) in at least one of a probe frame, an authentication frame, and an association frame. In addition, the WSC IE may include a Multi-AP extension subelement including MAP-related information. When the PBC event is triggered, the enrollee nA may configure a bit indicating that the PBC event is triggered in the WSC IE and transmit a probe request frame including the WSC IE. In addition, the enrollee nA may attempt to scan all channels. When the existing MAP agent eA receives a probe request frame including a WSC IE including a bit indicating that the PBC event is triggered, the existing MAP agent eA may configure a bit indicating that the PBC event is triggered in the WSC IE and transmit a probe response frame including the WSC IE. The existing MAP agent eA and the enrollee nA may exchange an authentication request frame, an authentication response frame, an association request frame, and an association response frame with each other. In this case, each of the authentication request frame, the authentication response frame, the association request frame, and the association response frame may include the WSC IE including the bit indicating that the PBC event is triggered. The existing MAP agent eA and the enrollee nA may recognize that the event is related to MAP onboarding based on the Multi-AP extension subelement, and perform the MAP onboarding process. The existing MAP agent eA and the enrollee nA may exchange Ml to M8 messages including network access credential information by using the extensible authentication protocol (EAP) with each other. In this case, the existing MAP agent eA may encrypt and transmit the information required for MAP network configuration to the enrollee nA through the M8 message. The information required for the MAP network configuration may include at least one of an operating channel of the backhaul BSS (BH channel), the SSID, and certificate(credential) information. In the present specification, the operating channel may indicate a channel on which an AP performs an operation. In addition, the operating channel may be defined as a channel width and a primary channel. After the end of the EAP, the enrollee nA may change the operating channel depending on the information on the operating channel of the backhaul BSS (BH channel) included in the information required for the MAP network configuration. In addition, the enrollee nA may attempt to access the backhaul BSS by using information on the certificate(credential) information included in the information required for the MAP network configuration. When the EAP fails, the enrollee nA and the existing MAP agent eA may exchange M1 to M8 messages including the network access credential information with each other again by using the EAP.

Figure 8:
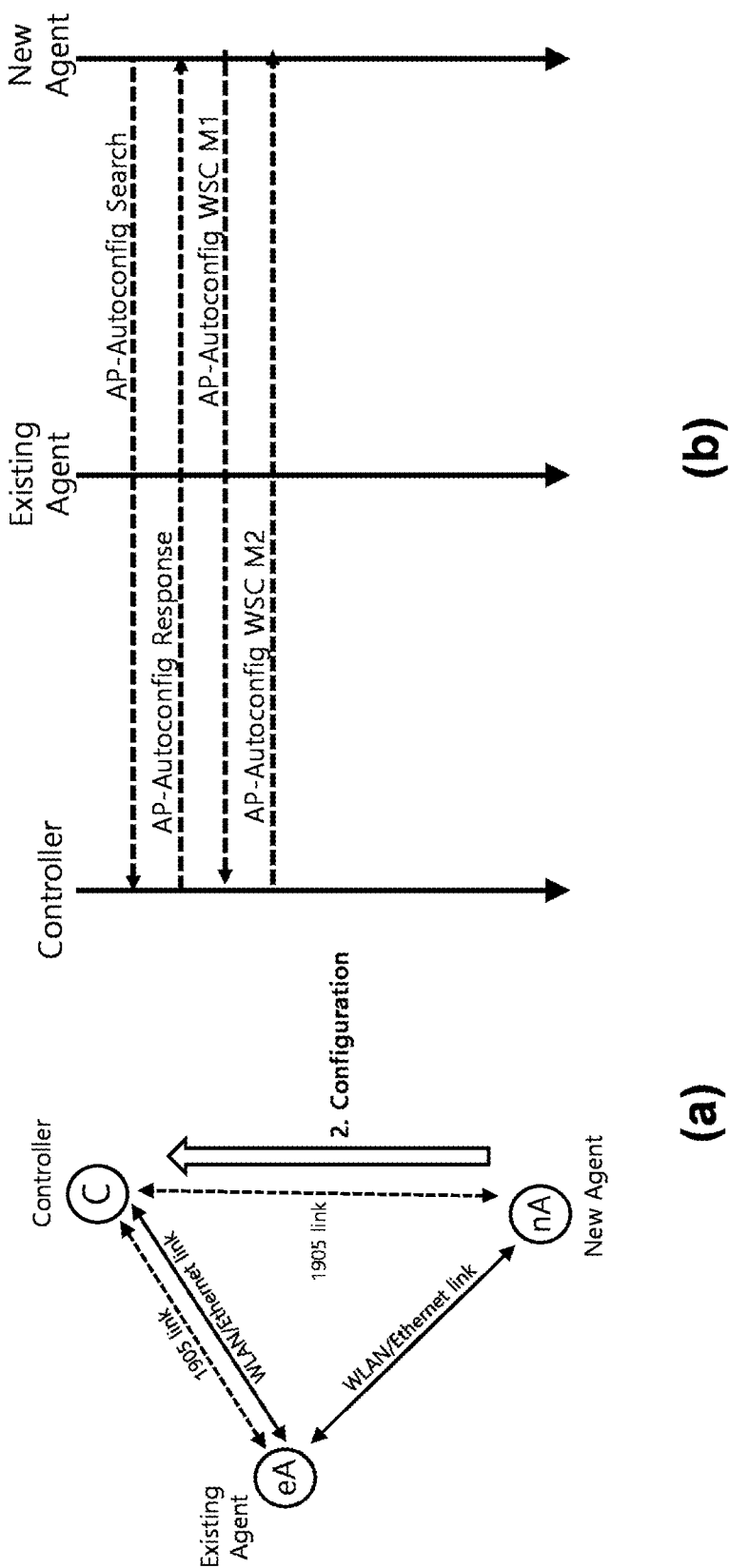
FIG. 8 shows a MAP configuration process according to an embodiment of the present disclosure.

FIG. 8 shows a MAP configuration process according to an embodiment of the present disclosure. FIG. 8(a) shows a connection relationship of a MAP device (New Agent) nA, that is, an enrollee, attempting to enroll in a MAP network, an existing MAP agent that has enrolled in the MAP network (Existing Agent) eA, and a MAP controller C of the MAP network. FIG. 8(b) shows the MAP configuration process of the enrollee nA.

The enrollee nA connected to the backhaul BSS and the backhaul link may use an AP-autoconfiguration message defined in the IEEE 1905 standard for MAP configuration. In this case, the backhaul link may be configured(set) through a wireless LAN link or an Ethernet link. Specifically, the backhaul link may be configured through the embodiment described with reference to FIG. 7. Specifically, the enrollee nA may transmit an AP-autoconfiguration Search message in a 1905 format to the MAP controller C through the backhaul link. In addition, the enrollee nA may encapsulate the AP-autoconfiguration Search message according to the protocol of the backhaul link being used. In addition, a search role of the AP-autoconfiguration Search message may be configured by the MAP controller. In this case, the MAP controller may transmit an AP-autoconfiguration Response message to the enrollee nA. Through this process, the enrollee nA and the MAC controller C may obtain an AL MAC address. The enrollee nA and the MAC controller C having obtained the AL MAC address may exchange M1 messages and M2 messages through AP-autoconfiguration WSC messages. Through this, the MAP controller C may transfer information required for the MAP configuration to the enrollee nA. Information required for the MAP configuration may include setting information in the fronthaul BSS.

The PBC-based onboarding described above requires the PBC event to be triggered on the enrollee and the MAP device in the MAP network. Therefore, when PBC-based onboarding is used, a user's action to trigger the PBC event may be required. In addition, for the WSC and the 1905 AP-autoconfiguration, a security protocol defined in a link on which the WSC and the 1905 AP-autoconfiguration are performed is used. In this case, security may become more vulnerable than when a separate security protocol is applied. Therefore, there is a need for a new MAP device onboarding method.

Figure 9:
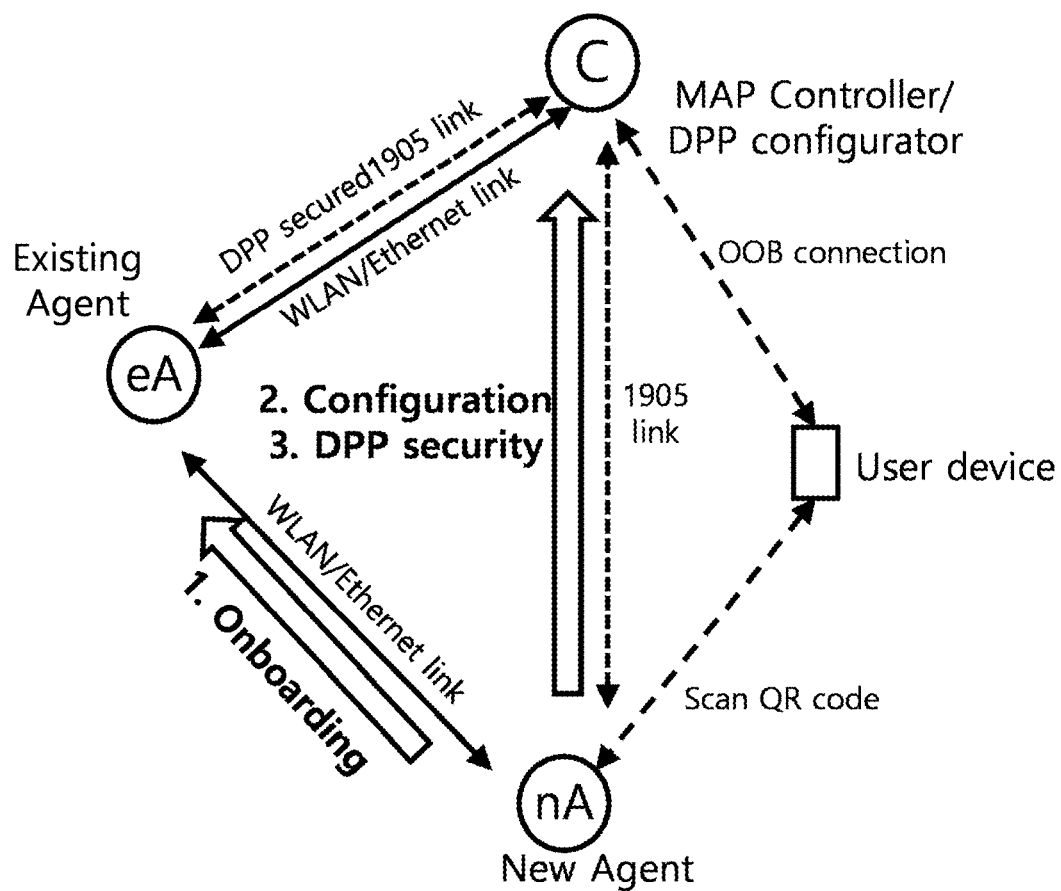
FIG. 9 shows a connection relationship of a MAP device (new agent, nA), that is, an enrollee, attempting to enroll in a MAP network, an existing MAP agent that has enrolled in the MAP network (existing agent, eA), a user device, and a MAP controller (C) of the MAP network.
Figure 10:
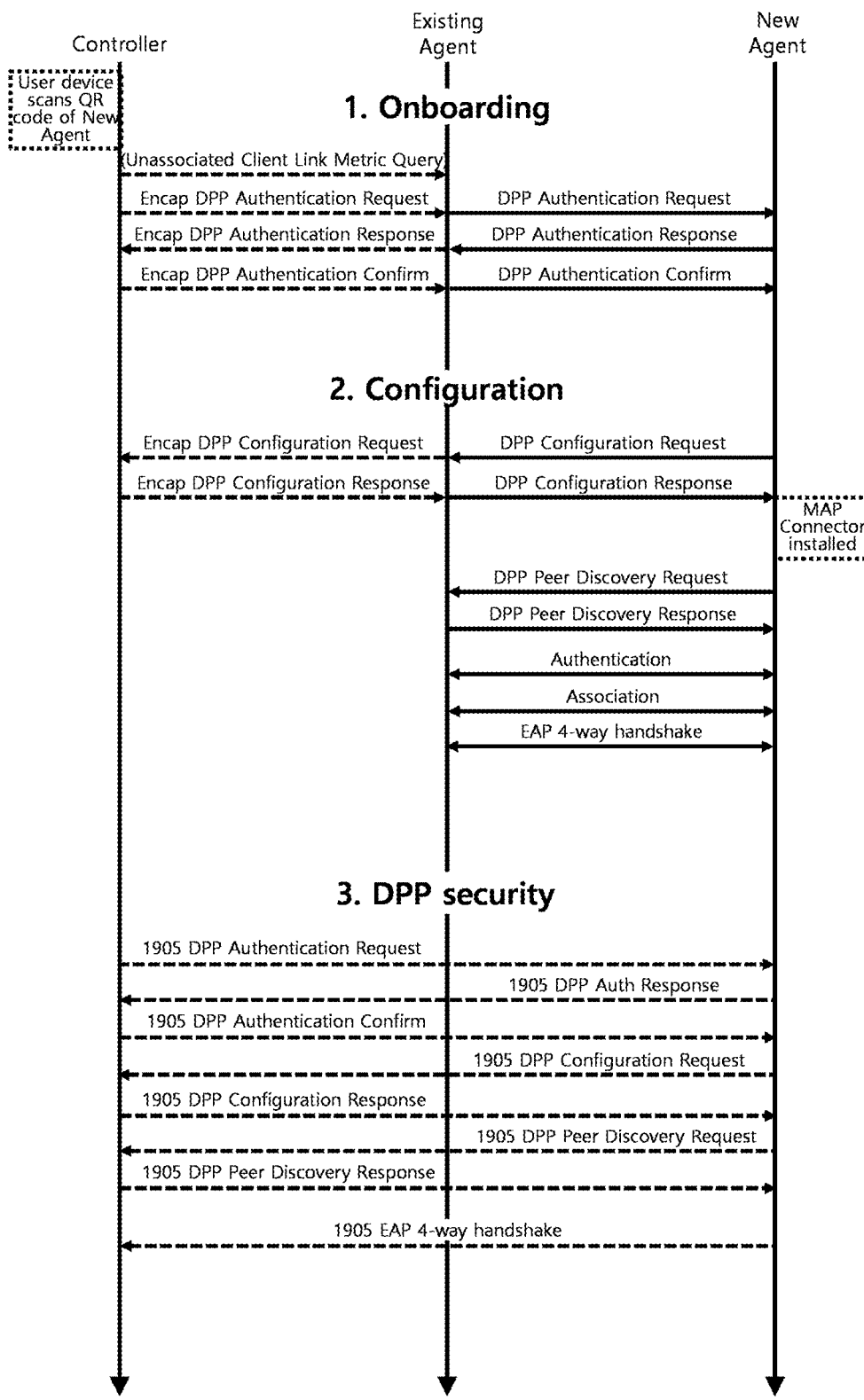
FIG. 10 shows an onboarding process using a device provisioning protocol (DPP) according to an embodiment of the present disclosure.

FIGS. 9 and 10 show an onboarding method using a device provisioning protocol (DPP) according to an embodiment of the present disclosure. FIG. 9 shows a connection relationship of a MAP device (New Agent) nA, that is, an enrollee, attempting to enroll in a MAP network, an existing MAP agent that has enrolled in the MAP network (Existing Agent) eA, a user device, and a MAP controller C of the MAP network. FIG. 10 shows an onboarding process using the DPP according to an embodiment of the present disclosure.

The DPP is a protocol that configures a secure link between a plurality of MAP devices. A message exchanged between a plurality of MAP devices for a DPP protocol is referred to as a DPP message. The MAP devices may exchange DPP messages by using IEEE 802.11 public action frames. In the DPP protocol, an entity that enrolls and provisions a MAP device is referred to as a DPP configurator. In the MAP network, the MAP controller C may serve as the DPP configurator. The enrollee nA may transfer information on bootstrap to the MAP controller C through an out-of-band (OOB). In this case, the OOB represents a link other than a physical link that is subject to security setting. The information on the bootstrap may include information on at least one of a bootstrap public key and a bootstrap channel. The bootstrap channel represents the channel on which a bootstrap process proceeds. For example, the user device may scan a quick response (QR) code attached to the enrollee nA to obtain the information on the bootstrap from a link indicated by the QR code. In another specific embodiment, the user device may obtain information on the bootstrap from the enrollee nA through near-field communication (NFC). In still another specific embodiment, the user device may obtain the information on the bootstrap from the enrollee nA through Bluetooth communication. The user device may transmit the obtained information on the bootstrap to the MAP controller C. The MAP controller C may obtain the information on the bootstrap from the user device and transmit a DPP authentication request to the enrollee nA. Since there is no direct link between the MAP controller C and the enrollee nA, the MAP controller C may forward the DPP authentication request to the enrollee nA through the MAP agent eA connected to the MAP controller C. In this case, the MAP controller C may encapsulate the DPP authentication request in the 1905 message format. The MAP agent eA that has received the DPP authentication request may reconstruct the DPP authentication request into a public action frame of the IEEE 802.11 standard and may transmit the reconstructed request to the enrollee nA. When the MAC address of the enrollee nA is not specified in the DPP authentication request received from the MAP controller C, the MAP agent eA may set the recipient address of the public action frame including the DPP authentication request to a broadcast address. In addition, in a specific embodiment, the information on the bootstrap may be defined as including the MAC address of the enrollee nA. Specifically, the enrollee nA may transmit the MAC address of the enrollee nA to the user device, and the user device may transmit the MAC address of the enrollee nA to the MAP controller. In this case, the MAP agent eA may clearly set the recipient address of the public action frame including the DPP authentication request to the MAC address of the enrollee nA.

When the enrollee nA receives the DPP authentication request, the enrollee nA transmits a DPP authentication response. The MAP agent eA that has transmitted the DPP authentication response from the enrollee nA may encapsulate the DPP authentication response in the 1905 message format and may transmit the DPP authentication response to the MAP controller. The MAP controller may receive the DPP authentication response from the MAP agent eA, and may transmit a DPP authentication confirmation to the enrollee nA in a manner in which the DPP authentication request is transmitted. The DPP authentication may be completed through this process.

A timeout may be applied to the DPP authentication procedure. Specifically, when the MAP agent eA that has transmitted the DPP authentication request does not receive the DPP response frame, the MAP agent eA that has transmitted the DPP authentication request may wait for reception of the DPP authentication response in the channel through which the DPP authentication request is transmitted from when the DPP authentication request is transmitted until a predetermined time elapses. When the MAP agent eA that has transmitted the DPP authentication request receives the DPP authentication response within a predetermined time from when the DPP authentication request is transmitted, the MAP agent eA that has transmitted the DPP authentication request may proceed with the next step of the onboarding process using the DPP. When the MAP agent eA that has transmitted the DPP authentication request does not receive the DPP authentication response within the predetermined time from when the DPP authentication request is transmitted, the MAP agent eA may transmit a message indicating that the DPP authentication has failed. In this case, the MAP agent eA may transmit the message informing that DPP authentication has failed in the 1905 message format. The MAP agent eA may operate a backhaul BSS or a fronthaul BSS in a channel different from the channel in which the DPP authentication is performed. This is because it is not desirable that the MAP agent eA does not monitor a channel operating the backhaul BSS or the fronthaul BSS for a long time while waiting for the DPP authentication response.

The MAP agent eA that has received the DPP authentication confirmation may be limited to setting the recipient address of the frame including the DPP authentication confirmation to the MAC address of the enrollee nA even if the MAP agent eA had set the recipient address of the frame including the DPP authentication request transmission to the broadcast address. To this end, when the MAP agent eA receives a frame including the DPP authentication response, the MAP agent eA may store the MAC address of the enrollee nA. In another specific embodiment, the MAP controller C may include the MAC address of the enrollee nA in the 1905 format message including DPP authentication confirmation.

When the MAP agent eA that has received the DPP authentication response transmits a DPP-related frame to the enrollee nA, the MAP agent eA that has received the DPP authentication response may receive a response to the corresponding frame or may wait for reception of the corresponding frame in the channel through which the DPP-related frame is transmitted until a predetermined time expires. Specifically, when the MAP agent eA that has received the DPP authentication response does not receive a response frame to the DPP-related frame, the MAP agent eA that has received the DPP authentication request may wait for reception of the response to the transmitted frame in the channel through which the DPP-related frame is transmitted from when the DPP-related frame is transmitted until a predetermined time elapses.

In addition, the MAP agent eA may transmit, to the MAP controller C, the DPP authentication response and a link metric between the enrollee and the MAP agent together. The link metric may be information indicating the link's characteristics. Specifically, the link metric may include at least one of a received signal strength indication (RSSI) and a received channel power indicator (RCCI). The MAP controller C may determine whether to proceed with the DPP process based on the link metric. Specifically, when the link metric does not satisfy a specified condition, the MAP controller C does not forward the DPP authentication confirmation to the MAP agent eA that has transmitted the DPP authentication response, and may forward the DPP authentication request to a MAP agent eA other than the MAP agent eA that has transmitted the DPP authentication response.

In still another specific embodiment, when the link metric does not satisfy a specified condition, the MAP controller C does not forward the DPP authentication confirmation to the MAP agent eA that has transmitted the DPP authentication response, and may forward the DPP authentication request to all MAP agents eA associated with the MAP controller C. In this case, the MAP controller C may receive the link metric for the link between the MAP agent eA and the enrollee nA from all MAP agents eA associated with the MAP controller C. In this case, the MAP controller C may determine a specific MAP agent eA to proceed with the DPP process based on the link metric. Alternatively, after a predetermined time elapses from when the MAP controller C forwards the DPP authentication request to all MAP agents eA associated with the MAP controller C, the MAP controller C may determine a specific MAP agent eA to proceed with the DPP process based on at least one of the link metric and a BSS situation. When the MAP agent eA to proceed with the DPP process is determined according to the embodiments, the determined MAP agent eA is a backhaul AP to associate with the enrollee nA.

Before the MAP controller C forwards the DPP authentication request to the MAP agent eA associated with the MAP controller C, the MAP controller C may transmit, to the MAP agent eA associated with the MAP controller C, a unassociated client link metric query message. When the MAP agent eA to which the DPP authentication request has been forwarded transmits the DPP authentication request to the enrollee nA, the MAP agent eA different from the MAP agent eA to which the DPP authentication request has been forwarded may measure information included in the link metric of the frame transmitted by the enrollee nA. In this case, the MAP agent eA different from the MAP agent eA to which the DPP authentication request has been forwarded may measure information included in the link metric of the frame transmitted by the enrollee nA on a channel indicated by the unassociated client link metric query message. The MAP agent eA different from the MAP agent eA to which the DPP authentication request has been forwarded, may transmit an unassociated client link metric response including the measured information to the MAP controller C. In addition, the MAP agent eA that has received the DPP authentication response from the enrollee nA, may transmit, to the MAP controller, the unassociated client link metric response together with the DPP authentication response.

When the MAP controller C transmits an unassociated client link metric query, the MAP controller C may include, in the unassociated client link metric query, an indicator indicating that it is an unassociated client link metric query for DPP authentication. This is because the MAP controller C may not be able to obtain the MAC address of the enrollee nA in a DPP bootstrapping process. In a specific embodiment, the MAP controller C may set the MAC address of the unassociated client link metric query to a predetermined value. In this case, the predetermined value may be a broadcast address.

After a DPP authentication process, the enrollee nA may trigger a DPP configuration process based on the certificate (credential) generated in the DPP authentication process. In the DPP configuration process, the enrollee nA may receive a configuration object. The configuration object may include a DPP connector. In the DPP configuration process, the enrollee and the MAP agent eA may communicate using a DPP frame transmitted through an 802.11 link configured according to the IEEE 802.11 standard, such as the DPP authentication described above. In addition, the MAP agent eA and the MAP controller C may exchange messages encapsulated in the 1905 format. When the authentication and key management suite (AKM) of the network configured by the MAP controller C is the DPP, the configuration object may include the DPP connector signed by the MAP controller C with a sign key. When the AKM of the network configured by the MAP controller C is a pre-shared key (PSK) or a simultaneous authentication of equals (SAE), the configuration object may include a password or pass-phrase corresponding to each of PSK or SAE. The MAP controller C may transmit a plurality of configuration objects corresponding to a plurality of networks managed by the MAP controller C through a DPP configuration response.

The enrollee nA that has received the DPP connector from the MAP controller C may transmit a DPP peer discovery request to a plurality of channels. The enrollee nA may transmit a DPP discovery request and wait for reception of the DPP peer discovery response.

In a general DPP peer discovery process, the configurator that exchanges DPP authentication or DPP configuration-related messages with the enrollee nA may not be a destination terminal to which the enrollee intends to access. Accordingly, the enrollee nA may have to scan all channels of a frequency band supported by the enrollee and transmit DPP peer discovery through all channels. Specifically, when the enrollee nA supports the 2.4 GHz band and the 5 GHz band, the enrollee nA may scan all channels supported by the enrollee nA in the 2.4 GHz band and all channels supported by the enrollee nA in the 5 GHz band. Since the MAP agent eA, with which the enrollee nA exchanges DPP messages, is the destination terminal in the above-described embodiment, the enrollee nA may not scan all channels. Specifically, when the MAP agent eA transmits the DPP authentication request or the DPP authentication confirmation, the MAP agent eA may perform the transmission by inserting information on a backhaul primary channel into a frame including the DPP authentication request or DPP authentication confirmation. After the DPP configuration process, the enrollee may configure a channel to transmit the DPP peer discovery based on information on the backhaul primary channel, and transmit the DPP peer discovery request in the corresponding channel.

When the MAP controller C designates the MAP agent eA to proceed with the DPP process, the enrollee nA may perform peer discovery in a backhaul channel of the designated MAP agent eA. When the MAP controller C does not designate the MAP agent eA to proceed with the DPP process and the enrollee nA includes information on the backhaul channel together with the DPP authentication request from the MAP agent eA in the DPP authentication process, the enrollee nA may perform DPP peer discovery in a channel indicated by the information on the backhaul channel. When the DPP peer discovery fails, the enrollee nA may scan all channels and transmit the DPP peer discovery request in all channels.

After successful peer discovery, the enrollee nA and the MAP agent eA perform an association procedure according to the IEEE 802.11 standard. The enrollee nA and the MAP agent eA perform an EAP 4-way handshake by using information included in the connector. Specifically, the enrollee nA and the MAP agent eA may perform the EAP 4-way handshake by using netAcessKey information included in the connector and generate PTK and GTK.

Through the embodiments described above, the enrollee nA and the MAP agent eA may configure a secured 802.11 link at a level defined by the DPP.

The MAP agent eA may transmit a client association event report to the MAP controller C. The MAP controller C may recognize that the enrollee nA has successfully onboarded to the MAP agent eA through the client association event report.

Since the MAP controller C is a DPP configurator and recognizes the bootstrap information of the enrollee nA, the MAP controller C may perform a DPP security process with the enrollee nA. Since the MAP controller C and the enrollee nA may exchange 1905 format messages with each other, the DPP frame may be exchanged through the 1905 format message in the DPP security process.

FIG. 11 shows a format of the frame used for the DPP authentication, information included in the frame, and an onboarding process using the DPP authentication, according to an embodiment of the present disclosure.

As described above, when the MAP agent eA receives the DPP authentication message from the MAP controller C, the MAP agent eA may change the DPP authentication message to a public action frame and transmit the changed message through the 802.11 link. The DPP authentication message may include the DPP authentication request and the DPP authentication response, which are described above. The DPP frame may include a multi-AP extension attribute.

FIG. 11(a) and FIG. 11(b) show a specific format of a public action frame used for DPP authentication according to an embodiment of the present disclosure and possible values of a field of the public action frame. FIG. 11(c) shows attributes that may be included in the public action frame used for DPP authentication according to an embodiment of the present disclosure. FIG. 11(d) shows a process for an enrollee to onboard to the MAP network using DPP authentication according to an embodiment of the present disclosure.

The public action frame used for DPP authentication may include a Multi-AP extension attribute. Since the public action frame has a 3-address structure, it may not include information on DPP configurator identification. The MAP controller C, which is a DPP configurator, may insert identification information of the MAP controller C into the Multi-AP extension attribute. In this case, the identification information of the MAP controller C may be a MAC address of the MAP controller C. In another specific embodiment, the identification information of the MAP controller C may be 6 octet information of a separate MAC address format designated for a configurator.

In addition, the MAP controller C may insert information on a channel used by the MAP agent e that transmits the DPP frame into the Multi-AP extension attribute. The information on the channel used by the MAP agent e may include at least one of information on a backhaul operating channel of the MAP agent eA transmitting the DPP frame and information on the backhaul primary channel of the MAP agent eA.

The MAP controller C may not insert the identification information of the MAP controller C described above into the multi-AP extension attribute of the public action frame used in the DPP authentication request, and may insert the identification information of the MAP controller C into the multi-AP extension attribute of the public action frame used for DPP authentication confirmation. The MAP controller C may not insert the information on the channel used by the MAP agent eA transmitting the DPP frame described above into the Multi-AP extension attribute of the public action frame used in the DPP authentication request, and may insert the information on the channel used by the MAP agent eA transmitting the DPP frame into the multi-AP extension attribute of the public action frame used for DPP authentication confirmation.

In addition, the Multi-AP extension attribute may include information on DPP authentication-related events. The MAP controller C may insert information on DPP authentication-related events into the Multi-AP extension attribute. When the MAP controller C transmits a DPP authentication request to all MAP agents eA connected to the MAP controller C in order to designate the MAP agent eA to proceed with the DPP process, the MAP controller C may insert, into the multi-AP extension attribute, information indicating that designation of the MAP agent eA is completed. The information indicating that the designation of the MAP agent eA is completed may be a bit of a predetermined position having a predetermined value. The enrollee nA, who has obtained information indicating that the designation of the MAP agent eA is completed, may destroy the DPP authentication-related information received from MAP agents other than the designated MAP agent eA. Then, the enrollee nA may proceed with the DPP process with the designated MAP agent eA.

In the above-described embodiments, it has been described that the message encapsulated in the 1905 format may be used. Specifically, in the above-described embodiments, it has been described that the MAP controller transmits the DPP message encapsulated in the 1905 format to the MAP agent. A type-length-value (TLV) of the DPP message encapsulated in the 1905 format will be described with reference to FIG. 12.

FIG. 12 shows a type-length-value (TLV) format of the DPP message according to an embodiment of the present disclosure.

The DPP message encapsulated in the 1905 format includes a Type field, a Length field, and a Value field. The Type field may indicate a value corresponding to the type of the DPP message. In this case, a unique value may be allocated for each type of the DPP message. In still another specific embodiment, the Type field may indicate a representative value indicating that the message is a DPP message. In this case, the type of the DPP message may be indicated in the Value field.

The Length field indicates the length of the TLV.

The Value field indicates specific information included in the DPP message.

The Value field may include a control bit indicating the configuration of the Value field. In addition, specifically, the Value field may include information indicating whether the DPP message is to be forwarded to the enrollee or directly transferred to the enrollee. This information may be referred to as forwarding information or final destination information. Specifically, the Value field may include a bit indicating whether the DPP message is to be forwarded to the enrollee or directly transferred to the enrollee. When the value of the bit is 1, the bit may be a forwarding bit indicating that the DPP message is to be forwarded. In another specific embodiment, when the value of the bit is 1, the bit may be a final destination bit indicating that the DPP message is to be directly transferred. In this case, that the DPP message is to be directly transferred means that the DPP message is to be directly transmitted to the final destination.

In addition, the Value field may include information in which the Value field indicates information on the DPP class and channel of the enrollee. Specifically, the Value field may include a bit in which the Value field indicates information on the DPP class and channel of the enrollee. The bit may be referred to as a class-and-channels control bit.

In addition, when the DPP message is to be forwarded to the enrollee, the Value field may include a field indicating the MAC address of the enrollee. In this case, the field indicating the MAC address may be referred to as an STA MAC address field. The MAP agent forwarding the DPP message may set the recipient address of the frame including the DPP frame according to a value indicated by the STA MAC address field.

The Value field may include a field indicating a DPP frame. The field may be indicated as a DPP public action frame type field. The Value field may include a DPP public action frame field indicating the frame body of the DPP frame.

The Value field may include information indicating a channel on which the DPP is performed. The enrollee may obtain information indicating a channel on which the DPP is performed from the DPP message, and may transmit the DPP message to the MAP controller on the channel indicated by the information indicating the channel. In addition, the Value field may include information on one or more channels in which the DPP is performed for each operating class in which the DPP is performed. Therefore, the Value field may include a field indicating the number of DPP classes. The field may be referred to as Number of Class-and-Channels. The following fields may be repeated as many times as the number indicated by the Number of Class-and-Channels field. First, the Value field may include a field indicating the class of DPP after the Number of Class-and-Channels field. This field may be referred to as an Operating Class field. In addition, the Value field may include a field indicating the number of channels on which the DPP corresponding to the Operating Class field is performed after the Operating class field. This field may be referred to as Number of channels for this class field. The Value field may include a field indicating a channel on which the DPP corresponding to the Operating Class field is performed after the Number of channels for this class field. This field may be referred to as a Channel Number field. In addition, the Value field may include as many Channel Number fields as the number indicated by the Number of channels for this class field after the Number of channels for this class field. As described above, the Operating Class field, Number of channels for this class field, and one or more Channel Number fields are repeated in the Value field as many as the number indicated by the Number of Class-and-Channels field.

FIG. 13 shows a configuration object and a connector used in a configuration process for a MAP controller and an enrollee to proceed through a MAP agent, according to an embodiment of the present disclosure. FIG. 13(a) shows the configuration object included in the DPP configuration request used in the configuration process for the MAP controller and the enrollee to proceed through the MAP agent, according to an embodiment of the present disclosure. FIG. 13(b) shows the configuration object included in the DPP configuration response used in the configuration process for the MAP controller and the enrollee to proceed through the MAP agent, according to an embodiment of the present disclosure. FIG. 13(c) shows the connector used in the DPP configuration used in the configuration process for the MAP controller and the enrollee to proceed through the MAP agent, according to an embodiment of the present disclosure. FIG. 14 shows the configuration process for the MAP controller and the enrollee to proceed through the MAP agent, according to an embodiment of the present disclosure. FIG. 14(a) shows a case in which the MAP agent does not report link characteristics to the MAP controller in the configuration process for the MAP controller and the enrollee to proceed through the MAP agent, according to an embodiment of the present disclosure, and FIG. 14(b) shows a case in which the MAP agent reports link characteristics to the MAP controller in the configuration process for the MAP controller and the enrollee to proceed through the MAP agent, according to an embodiment of the present disclosure.

When the enrollee proceeds with DPP configuration after the onboarding, the enrollee transmits the DPP configuration request to the MAP agent. In this case, the enrollee may transmit the DPP configuration request by using an 802.11 generic advertisement service (GAS) frame format. The enrollee may set each attribute of the configuration object of the configuration request as follows. The enrollee may set the Wi-Fi Technology of the configuration object of the configuration request to a value indicating infrastructure communication (infra). In addition, the enrollee may set the network role of the configuration object of the configuration request to a value indicating the MAP backhaul station (MAP backhaul STA). This is because the enrollee transmits the configuration request to access the backhaul BSS of the MAP agent. The MAP agent that has received the DPP configuration request encapsulates the DPP configuration request in the 1905 format, and forwards the encapsulated DPP configuration request to the MAP controller.

The MAP controller generates the connector based on the received configuration object. The MAP controller transmits a DPP configuration response including the connector to the MAP agent. In this case, the MAP controller may encapsulate the DPP configuration response in the 1905 format. The MAP agent that has received the DPP configuration response converts the DPP configuration response into a frame format of the IEEE 802.11 standard and transmits it to the enrollee. The DPP configuration response includes the configuration object and information on a credential. The MAP controller may set AKM of the configuration object to a value indicating the DPP. This is because it is assumed that the MAP agent forwarding the DPP configuration response supports the DPP. In addition, the MAP controller may insert netAccessKey, which is information indicating a private key of the enrollee, into the connector. In addition, the MAP controller may set the netRole of the configuration object to a value indicating a backhaul station of the MAP (Multi-AP bSTA). In addition, the MAP controller may set groupid of the configuration object to a value indicating the backhaul. netAccessKey may be information on a public protocol key of the enrollee generated in the DPP authentication process.

In the peer discovery process, the MAP controller may be connected with an R1 MAP agent that supports only a PBC method, not an R2 MAP agent that supports the DPP. The R1 MAP agent may use at least one of the PSK and the SAE as a backhaul certificate(credential). Accordingly, the MAP controller may set the backhaul certificate(credential) of the configuration object to a value indicating at least one of the PSK, the SAE, and the DPP (dpp+ psk+ sae). In this case, the configuration object may include the connector, a password of the PSK, and a password of the SAE.

When the MAP controller forwards the DPP authentication response, the MAP controller may insert the Multi-AP extension into the frame including the DPP authentication response as described above. The multi-AP extension may include information on a channel of a backhaul BSS operated by the MAP agent connected to the MAP controller. The MAP agent that forwards the DPP authentication response may insert the Multi-AP extension into the frame including the DPP configuration response as a subelement.

The enrollee that has received the DPP configuration response installs the connector. Then, the enrollee may start a channel scan for DPP peer discovery. The enrollee may obtain information on the channel of the backhaul BSS by using the multi-AP extension described above or the method described in the above-described embodiments. In this case, the enrollee may first scan a channel indicated by the information on the channel of the backhaul BSS. The enrollee may obtain the SSID and the DPP of akm suite by receiving the frame on the scanned channel. In this case, the frame may be a beacon frame. When the obtained SSID and the DPP of akm suite match the connector of the enrollee, the connector may transmit the DPP peer discovery request in the corresponding channel. In another specific embodiment, the enrollee may transmit the DPP peer discovery request to all channels without performing scanning.

The MAP agent that has received the DPP peer discovery request obtains the connector from a frame including the DPP peer discovery request. Values indicated by the sign key, groupid, and netRole of a configurator of the connector are obtained. When the obtained values match the connector of the MAP agent, the MAP agent transmits the DPP peer discovery response to the enrollee. Specifically, the condition in which the obtained values match the connector of the MAP agent may include whether the value of the obtained sign key is the same as the sign key of the configurator of the connector of the MAP agent. Further, the condition in which the obtained values match the connector of the MAP agent may include whether the obtained groupid is the same as the group ID of the connector of the MAP agent. In addition, the condition in which the obtained values match the connector of the MAP agent may include whether it is possible for the obtained netRole to be associated with the netRole of the connector of the MAP agent.

The enrollee receives the DPP peer discovery response. The enrollee obtains the connector from the received DPP peer discovery response. When the obtained connector and the connector of the enrollee match each other, the enrollee proceeds with an association process for the IEEE 802.11 standard with the MAP agent that has transmitted the DPP peer discovery response. In this case, the enrollee may obtain a plurality of connectors by proceeding with the peer discovery process with a plurality of MAP agents. The enrollee may proceed with the association process for the IEEE 802.11 standard by selecting the most suitable MAP agent from among the plurality of MAP agents that has transmitted the connector. The MAP agent and the enrollee generates a shared channel by using the obtained netAccess-Key and private key. A pairwise master key (PMK) may be generated through the generated shared channel. The MAP agent and the enrollee may use the PMK to proceed with the EAP 4-way handshake. The MAP agent and the enrollee may generate a pairwise transient key (PTK) and a group transient key (GTK) through the EAP 4-way handshake.

The MAP agent may measure the characteristics of a link through which a frame including the DPP peer discovery request is transmitted while receiving the DPP peer discovery request. In this case, the characteristic of the link may be information included in the link metric described above. Specifically, the link characteristics may include RCPI. The MAP agent may transmit the measured link characteristics to the MAP controller. Specifically, the MAP agent may transmit the measured link characteristics of the link to the MAP controller through a separate unassociated client link metric response. In another specific embodiment, the MAP agent may insert measured link characteristics into the frame including the DPP peer discovery request as a client link metric TLV. Since the link characteristics measured in the embodiments are measured in the channel of the backhaul BSS while the MAP agent and the enrollee actually communicate, the effectiveness may be greater than the link characteristics measured in the DPP authentication process. When the MAP controller receives the link characteristics measured from a plurality of MAP agents, the MAP controller may designate an optimal peer MAP agent in consideration of the network environment and the measured link characteristics. The MAP controller may transmit, to the designated MAP agent, information indicating that the transmission of the peer discovery response is permitted, by using the 1905 format message. In the embodiment, even when the MAP agent receives the peer discovery request and the connector of the peer discovery request matches the connector of the MAP agent, the MAP agent may not transmit the peer discovery response directly to the enrollee. In this case, when the MAP agent receives, from the MAP controller, information indicating that transmission of the peer discovery response is permitted, the MAP agent may transmit the peer discovery response to the enrollee.

The enrollee associated with the backhaul may proceed with DPP security for the end-to-end 1905 link with the MAP controller. This will be described with reference to FIGS. 15 and 16.

FIG. 15 shows a format of a DPP configuration message used by a MAP controller in an end-to-end DPP security process with the enrollee, according to an embodiment of the present disclosure. FIG. 15(a) shows a configuration object included in a DPP configuration request used by a MAP controller in the end-to-end DPP security process with the enrollee, according to an embodiment of the present disclosure. FIG. 15(b) shows a configuration object included in the DPP configuration response used by the MAP controller in the end-to-end DPP security process with the enrollee, according to an embodiment of the present disclosure. FIG. 15(c) shows a connector used in the DPP configuration used by the MAP controller in the end-to-end DPP security process with the enrollee, according to an embodiment of the present disclosure. FIG. 16 shows an end-to-end DPP security process with an enrollee by a MAP controller, according to an embodiment of the present disclosure. FIG. 16(a) shows the end-to-end DPP security process with the enrollee, which includes the DPP authentication process, by the MAP controller, according to an embodiment of the present disclosure, and FIG. 16(b) shows the end-to-end DPP security process with the enrollee, which does not include the DPP authentication process, by the MAP controller, according to an embodiment of the present disclosure.

When the enrollee nA completes the backhaul connection, the MAP agent eA that operates the backhaul BSS may transmit, to the MAP controller C, a message for reporting an update of the client association event for the backhaul BSS. The MAP controller C that has recognized the backhaul connection of the enrollee in the MAP network may proceed with the security process for the 1905 link by using the DPP protocol. In this case, the MAP controller C may encapsulate information required for the DPP process in the 1905 message format and transmit the encapsulated information, as in the embodiment described with reference to FIGS. 9 and 10. The entity proceeding with the DPP process may be identified by the AL MAC address of the MAP controller C and the AL MAC address of the enrollee nA. In another specific embodiment, the entity proceeding with the DPP process may be identified by an identifier of the configurator and the AL MAC address of the enrollee nA. When the MAP controller C does not obtain the AL MAC address of the enrollee, the MAP controller C may transmit the DPP message to the enrollee nA by using relayed multicast. When the MAP controller C obtains the AL MAC address of the enrollee, the controller C may transmit the DPP message to the enrollee nA by using unicast. As described above, the DPP message may include an indicator indicating whether the DPP message is to be forwarded to the enrollee or directly transferred to the enrollee in the DPP message. Since the DPP message is transmitted between 1905 entities without forwarding, the MAP controller C may be configured to directly transfer the corresponding indicator to the enrollee.

The MAP controller C may receive an AP-autoconfig search message transmitted by the enrollee nA in the MAP onboarding process. In this case, after the MAP controller C receives the AP-autoconfig search message, the MAP controller C may transmit the AP-autocnofig response to the enrollee nA. In addition, the MAP controller C may insert information indicating that it is an R2 controller supporting the DPP into a SupportedRole field of the AP-autocnofig response. The enrollee nA may receive an AP-autoconfig response. In this case, the enrollee nA may obtain the AL MAC address of the R2 controller from the AP-autoconfig response. Since the enrollee nA obtains the AL MAC address of the R2 controller, the enrollee nA may proceed with the DPP authentication process by transmitting the authentication request encapsulated in the 1905 format to the R2 controller by unicast.

After DPP authentication, the enrollee nA may transmit the DPP configuration request encapsulated in the 1905 format to the MAP controller C. In this case, the MAP controller C may generate a connector for 1905 DPP security and insert the generated connector into the DPP configuration request message. The MAP controller C may set the value of Wi-Fi Technology of the connector to a value indicating MAP (MAP). The MAP controller C may set the value of the role of the connector to a value indicating the MAP agent (MAP Agent). Since the DPP configuration is performed between MAP devices supporting the DPP, the akm value of the configuration object of the DPP configuration message may be set to a value indicating DPP (DPP).

Since DPP authentication is proceeded with separately from the onboarding process, the MAP controller C and the enrollee nA may not reuse netAccessKey generated in the onboarding process. The MAP controller C may use the public protocol key generated in the DPP authentication process as netAceessKey. The enrollee nA that has obtained the connector through the DPP configuration response may transmit the DPP peer discovery request encapsulated in the 1905 message format to the MAP controller C by unicast. The MAP controller C may validate the connector and set the Role value of the connector to a value indicating the MAP controller (Multi-AP Controller). The MAP controller C may transmit the DPP peer discovery response encapsulated in the 1905 message format and including the connector to the enrollee nA.

In another specific embodiment, the MAP controller C and the enrollee nA may reuse netAccessKey generated in the onboarding process. This is because it may be inefficient to repeat the authentication process again in the DPP process since the MAP controller C has completed the authentication of the enrollee nA in the onboarding process. After onboarding and backhaul configuration of the enrollee nA, the enrollee nA may request the DPP connector by transmitting the DPP configuration request to the MAP controller C. When the enrollee nA obtains the AL MAC address of the MAP controller C in the onboarding process, the enrollee nA may transmit the DPP configuration request to the AL MAC address of the MAP controller C by unicast. When the enrollee nA does not obtain the AL MAC address of the MAP controller C in the onboarding process, the enrollee nA may transmit the DPP configuration request to the MAP controller C by using relayed multicast. The MAP controller C that has received the DPP configuration request may generate a connector for the DPP configuration. The enrollee nA and the MAP controller C may reuse key information generated in the onboarding process as netAccessKey. The MAP controller C may transmit the generated connector through the DPP configuration response message. The enrollee nA may receive the connector of the MAP controller C through the DPP configuration response message and install the connector of the MAP controller C. The enrollee nA may transmit the connector of the enrollee nA through the DPP peer discovery request. In addition, the MAP controller C and the enrollee nA may generate PMK, PTK and GTK for the 1905 link.

After the enrollee onboards to the MAP network, the enrollee may operate as the backhaul AP and the fronthaul AP of the MAP network. To this end, the MAP controller and the enrollee may exchange additional configuration objects. This will be described with reference to FIGS. 17 and 18.

FIG. 17 shows a configuration object exchanged between the MAP controller and the enrollee such that the enrollee operates as a backhaul AP, according to an embodiment of the present disclosure.

For convenience of description, the configuration object exchanged between the MAP controller and the enrollee such that the enrollee operates as the backhaul AP is referred to as a backhaul AP configuration object. In addition, among the backhaul AP configuration objects, an object transmitted together with the configuration request is referred to as a backhaul AP configuration request object. In addition, among the backhaul AP configuration objects, an object transmitted together with the configuration response is referred to as a backhaul AP configuration response object. FIG. 17(a) shows the backhaul AP configuration request object according to an embodiment of the present disclosure, FIG. 17(b) shows the backhaul AP configuration response object according to an embodiment of the present disclosure, and FIG. 17(c) shows a connector transmitted together at the time of exchanging the backhaul AP configuration object.

The MAP controller and the enrollee may set Wi-Fi tech of the backhaul AP configuration object to a value indicating operating as an AP of an internal network (infra). In addition, the enrollee may set netRole of the backhaul AP configuration request object to a value indicating the backhaul AP of the MAP network (MAP backhaul AP). The MAP controller may set the SSID of the backhaul AP configuration response object to the SSID of the backhaul. The MAP controller may set the AKM of the backhaul AP configuration response object to a value indicating at least one of PSK, SAE, and DPP (psk+ sae+ dpp). This is because a new enrollee that does not support the DPP may access the MAP network. At the time of exchanging the backhaul AP configuration object, the password and the connector may be exchanged together. groupId of the connector may be set to a value indicating the backhaul (backhaul). In addition, netRole of the connector may be set to a value indicating the backhaul AP of the MAP network (MAP backhaul AP).

FIG. 18 shows a configuration object exchanged between the MAP controller and the enrollee such that the enrollee operates as a fronthaul AP, according to an embodiment of the present disclosure.

For convenience of description, the configuration object exchanged between the MAP controller for the enrollee to operates as the fronthaul AP is referred to as a fronthaul AP configuration object. In addition, among the fronthaul AP configuration objects, an object transmitted together with the configuration request is referred to as a fronthaul AP configuration request object. In addition, among the fronthaul AP configuration objects, an object transmitted together with the configuration response is referred to as a fronthaul AP configuration response object. FIG. 18(a) shows the fronthaul AP configuration request object according to an embodiment of the present disclosure, FIG. 18(b) shows the fronthaul AP configuration response object according to an embodiment of the present disclosure, and FIG. 18(c) shows a connector transmitted together at the time of exchanging the fronthaul AP configuration object.

The MAP controller and the enrollee may set the Wi-Fi tech field of the fronthaul AP configuration object to a value indicating operating as an AP of the internal network (infra). In addition, the enrollee may set netRole of the fronthaul AP configuration request object to a value indicating the fronthaul AP of the MAP network (MAP fronthaul AP). The MAP controller may set the SSID of the fronthaul AP configuration response object to the SSID of the fronthaul. The MAP controller may set the AKM of the fronthaul AP configuration response object to a value indicating at least one of PSK, SAE, and DPP (psk+ sae+ dpp). This is because a new enrollee that does not support the DPP may access the MAP network. At the time of exchanging the fronthaul AP configuration object, the password and the connector may be exchanged together. groupId of the connector may be set to a value indicating the fronthaul (fronthaul). In addition, netRole of the connector may be set to a value indicating the fronthaul AP of the MAP network (MAP fronthaul AP).

When the MAP controller receives the bootstrap information of the wireless LAN station supporting the DPP, the MAP controller may perform the DPP process through the MAP agent in the MAP network as described above. In this case, when the MAP controller receives a configuration object set to a value of Wi-Fi tech (infra) indicating intra-network communication and a value of Network Role (STA) indicating the station, from the wireless LAN station, the MAP controller may transmit, to the wireless LAN station, a connector set to a value of groupId indicating the fronthaul (fronthaul) and a value of netRole indicating the station (STA).

The enrollee may receive the configuration object for each role played by the enrollee. Roles played by the enrollee may include at least one of the MAP agent, the MAP backhaul AP, and the MAP fronthaul AP, as described above. Specifically, the enrollee may receive the configuration object through a response to the DPP configuration request message encapsulated in the 1905 format message for each role played by the enrollee. In addition, the enrollee may receive one configuration object including objects for a plurality of roles played by the enrollee. Specifically, the enrollee may receive one configuration object including all objects for all roles played by the enrollee. In a specific embodiment, the enrollee may receive one configuration object including all objects for all roles played by the enroller, through the response to the DPP configuration request message encapsulated in the 1905 format message.

FIG. 19 shows a DPP security method using a message encapsulated in a 1905 format according to another embodiment of the present disclosure.

As described above, the configurator that has received the DPP configuration request in the DPP process, that is, the MAP controller C may transmit a configuration object of various purposes to the enrollee nA that has transmitted the DPP configuration request. In this case, when the MAP controller receives the DPP configuration request, the MAP controller C may transmit, to the enrollee nA, the object and connector described with reference to FIGS. 15 to 18 together with the DPP configuration response.

When the enrollee nA receives all of the above-described configuration objects and the enrollee is coupled to the backhaul BSS, the DPP authentication process and the DPP configuration process proceeding through the 1905 format message may be omitted, and the peer discovery step may proceed. Specifically, the enrollee nA may transmit a DPP peer discovery request for DPP configuration to the MAP controller C. Subsequent processes may be the same as those described with reference to FIGS. 15 and 16. In addition, the MAP controller C may first transmit the DPP configuration request to the enrollee nA. This is because the enrollee nA may not need to trigger the DPP configuration process. Specifically, when the MAP controller C receives a client association event notification message indicating that the enrollee nA has onboarded to the MAP network, the MAP controller C may transmit the DPP configuration request to the enrollee nA. In addition, after AP-autoconfiguration discovery and AP-autoconfiguration response are exchanged, the enrollee nA may proceed with peer discovery.

After the enrollee nA completes the DPP peer discovery, 1905 4-way handshake, the enrollee nA may receive the above-described configuration object through the DPP configuration process encapsulated in a separate 1905 format message after exchanging the AP-autoconfig WSC message including information on AP wireless configuration. This is because the enrollee nA may operate each of the fronthaul BSS and the backhaul BSS only after the enrollee nA obtains information on the wireless configuration for each of the fronthaul BSS and the backhaul BSS from the MAP controller. FIG. 19(*a*) shows the DPP security method when the enrollee nA receives the configuration object before DPP peer discovery. FIG. 19(*b*) shows the DPP security method when the enrollee nA receives the configuration object after DPP peer discovery.

Even if the MAP agent connected to the enrollee does not support the DPP, the enrollee may configure a 1905 secure link with a MAP controller that supports the DPP. This will be described with reference to FIG. 20.

FIG. 20 shows that an enrollee proceeds with a DPP configuration with a MAP controller supporting the DPP when the MAP agent connected to the enrollee does not support the DPP, according to an embodiment of the present disclosure. FIG. 20(*a*) shows a connection relationship of a MAP device (New Agent) nA, that is, an enrollee, that has performed enrollment in a MAP network, an existing MAP agent that has enrolled in the MAP network (Existing Agent) eA, and a MAP controller C of the MAP network. FIG. 20(*b*) shows a DPP configuration process of the enrollee nA and the MAP controller C.

The user may have difficulty grasping both a topology of the MAP network and the capability of the MAP device included in the MAP network. Therefore, even if the MAP agent of the MAP network does not support the DPP, the user may attempt the DPP-based onboarding of the enrollee nA. As described above, the user may transfer the bootstrap information of the enrollee nA to the MAP controller C through the OOB. For example, the user may scan the QR code of the enrollee nA and transfer the bootstrap information of the enrollee to the MAP controller C. In addition, the enrollee nA may not receive responses from all MAP agents eA that support DPP in the DPP authentication process.

When the MAP controller C does not receive a response from any of the MAP agents in the DPP authentication process, the MAP controller C may induce a connection between the MAP agent eA that does not support the DPP and the enrollee nA. Specifically, the MAP controller C may induce the user to perform a user input on the enrollee nA and the MAP agent eA that does not support DPP. In this case, the user input may be an input using a physical button or a separate application. When a PBC event is triggered through the user input, a PBC onboarding process may proceed. In this case, the 802.11 link secured by the DPP may not be established. When the enrollee nA onboards to the MAP network and the MAP controller C holds information on the bootstrap public key of the enrollee nA, the MAP controller C may initiate the DPP security process. Specifically, when the enrollee nA onboards to the MAP network and the MAP controller C holds the information on the bootstrap public key of the enrollee nA without using the DPP security process, the MAP controller C may initiate the DPP security process. However, when the MAP controller C obtains the information on the bootstrap public key of the enrollee nA through the OOB, the MAP controller C may trigger the DPP security process for establishing the secured link after the enrollee nA onboards to the MAP network. In this case, the secured link may be a link through which a message in the 1905 format is transmitted. In addition, the DPP security process may include the DPP authentication process and the DPP configuration process.

When the MAP controller C obtains the information on the bootstrap public key of the enrollee nA, the MAP controller C may maintain the information on the bootstrap public key of the enrollee nA until DPP authentication is completed or a predetermined time elapses from when the information on the bootstrap public key of the enrollee nA is obtained. This may allow the MAP controller C to transmit the DPP authentication request encapsulated in the 1905 format message to the enrollee nA when the enrollee nA onboards to the MAP network through the PBC method before the predetermined time elapses from when the MAP controller C obtains the information on the bootstrap public key of the enrollee nA. In this way, the MAP controller C may start the process for configuring a DPP secured end-to-end link with the enrollee nA. At this time, as described above, the MAP controller C may recognize that the enrollee nA has onboarded to the MAP network by receiving a client association event notification message from the MAP agent eA.

In addition, the MAP controller C may transmit the AP-autoconfig response to the AP-autoconfig search transmitted by the enrollee nA and then transmit the DPP authentication request encapsulated in the 1905 format message to the enrollee nA. After the MAP controller C transmits the DPP authentication request encapsulated in the 1905 format message to the enrollee nA, the MAP controller C and the enrollee nA may proceed with the DPP authentication process, the DPP configuration process, and the DPP peer discovery process. In addition, after the DPP authentication process, the DPP configuration process, and the DPP peer discovery process, the MAP controller C and the enrollee nA may generate PTK and GTK to be used on the 1905 link through the EAP 4-way handshake.

When the registrar nA transmits an AP-autoconfiguration search indicating the support of the DPP in a supported role, the MAP controller C may transmit an AP-autoconfiguration response indicating the support of the DPP in the supported role. In this case, when the MAP controller C holds a public key not used for authentication, the MAP controller C may insert information on the public key not used for authentication into the AP-autoconfiguration response. The public key not used for authentication may be a hashed public key obtained through a hash algorithm or a value obtained by hashing a MAC address obtained by the MAP controller C at the time of bootstrapping. In this case, the hash algorithm may be a secure hash algorithm (SHA)-256. The enrollee nA that has received the AP-autoconfiguration response may compare the hashing value included in the AP-autoconfiguration response with the hashing value held by the enrollee nA. When the hashing value included in the AP-autoconfiguration response matches the hashing value held by the enrollee nA, the enrollee nA may proceed with the DPP authentication process. Specifically, when the hashing value included in the AP-autoconfiguration response matches the hashing value held by the enrollee nA, the enrollee nA may transmit a query requesting DPP authentication to the MAP controller C. In addition, when the hashing value included in the AP-autoconfiguration response matches the hashing value held by the enrollee nA, the enrollee nA may transmit, to the MAP controller C, an encapsulated ACK in the 1905 format message indicating that the two hashing values have been verified to match each other. In addition, when the hashing value included in the AP-autoconfiguration response matches the hashing value held by the enrollee nA, the enrollee nA may wait for the start of the DPP authentication process for a predetermined time from when the AP-autoconfiguration response is received. When the hashing value included in the AP-autoconfiguration response and the hashing value held by the enrollee nA do not match, the enrollee nA may transmit the AP-autoconfiguration WSC M1 to the MAP controller C to proceed with the MAP network configuration process without DPP.

When the MAP controller C receives a query requesting the DPP authentication, the MAP controller C may start the DPP authentication process. In addition, when the MAP controller C receives the ACK encapsulated in the 1905 format message indicating that the hashing values have been verified to match each other, the MAP controller C may start the DPP authentication process. When the AP-autoconfiguration WSC M1 is not received from when the MAP controller C transmits the AP-autoconfiguration response until a predetermined time elapses, the MAP controller C may start the DPP authentication process. In the embodiments, the MAP controller C may transmit the message for starting the DPP authentication process to start the DPP authentication process.

Although the present disclosure has been described by using wireless LAN communication as an example, the present disclosure is not limited thereto and may be equally applied to other communication systems such as cellular communication. Additionally, while the method, device, and system of the present disclosure are described in relation to specific embodiments thereof, some or all of the components or operations of the present disclosure may be implemented using a computer system having a general-purpose hardware architecture.

Features, structures, effects, and the like described in the foregoing embodiments are included in at least one embodiment of the present disclosure, and are not necessarily limited to only one embodiment. Furthermore, the features, structures, effects, or the like illustrated in each embodiment may be combined or modified with other embodiments by those skilled in the art to which the embodiments belong. Therefore, these combinations and modifications should be contemplated as falling within the scope of the present disclosure.

The present disclosure has been described with reference to the embodiments, but these are only exemplary and do not intend to limit the present disclosure, and those skilled in the art to which the present disclosure pertains will appreciate that various modifications, variations, and alterations that are not illustrated above could be made without departing from the essential characteristics of the present disclosures. For example, the components specifically shown in the embodiment may be modified. It should be construed that differences associated with such modifications, variations, and alternations fall within the spirit and scope of the present disclosure defined by the accompanying claims.

What is claimed is:

1. An access point that is an enrollee attempting to enroll in a multiple access point network, the access point comprising:
a transmit/receive unit; and
a processor functionally connected to the transmit/receive unit,
wherein the processor is configured to:
receive, from a multiple access point device, a first device provisioning protocol (DPP) message when an enrollee onboards to a multiple access point network by using a DPP,
transmit, to the multiple access point device, a second DPP message that is a response to the first DPP message,
wherein the second DPP message is transmitted from the multiple access point device to a controller that controls the multiple access point network, wherein the second DPP message is received by the controller within a preconfigured time,
wherein the first DPP message includes information for a DPP authentication and the first DPP message is generated by the controller,
wherein the first DPP message is transmitted from the controller to the multiple access point device,
when the first DPP message includes information related to a medium access control (MAC) address of the enrollee, a transmission method of the first DPP message is unicast,
when the first DPP message does not include the information related to the MAC address of the enrollee, the transmission method of the first DPP message is broadcast,
wherein the MAC address is obtained by a user equipment (UE) from the enrollee,
wherein the MAC address is transmitted by the UE to the controller.

2. The access point of claim 1,
wherein the first DPP message includes information related to a channel on which the DPP is performed,
wherein the second DPP message is transmitted on a channel indicated by the information related to the channel.

3. The access point of claim 2,
wherein the number of the channel on which the DPP is performed is plural.

4. The access point of claim 1,
wherein when the second DPP message is not received by the controller within the preconfigured time, the controller retransmits the first DPP message.

5. The access point of claim 1,
wherein a security process for the DPP to establish a secured link between the controller and the enrollee is initiated by the controller when the enrollee onboards to the multiple access point network without using the security process for the DPP and the controller holds information on a bootstrap public key of the enrollee.

6. An access point that is a controller configured to control a multiple access point network, the access point comprising:
a transmit/receive unit; and
a processor functionally connected to the transmit/receive unit,
wherein the processor is configured to:
transmit, to a multiple access point device, a first device provisioning protocol (DPP) message when an enrollee attempting to enroll in a multiple access point network onboards to the multiple access point network by using a device provisioning protocol (DPP),
wherein the first DPP message is transmitted from the multiple access point device to the enrollee,
wherein the first DPP message includes information for a DPP authentication,
receive, from the multiple access point device, a second DPP message that is a response to the first DPP message,
wherein the second first DPP message is transmitted from the enrollee,
wherein the second DPP message is received within a preconfigured time,
when the first DPP message includes information related to a medium access control (MAC) address of the enrollee, a transmission method of the first DPP message is unicast,
when the first DPP message does not include the information related to the MAC address of the enrollee, the transmission method of the first DPP message is broadcast,
wherein the MAC address is obtained by a user equipment (UE) from the enrollee, wherein the MAC address is transmitted by the UE to a controller that controls the multiple access point network.

7. The access point of claim 6,
wherein the first DPP message includes information related to a channel on which the DPP is performed,
wherein the second DPP message is transmitted on a channel indicated by the information related to the channel.

8. The access point of claim 7, wherein the number of the channel on which the DPP is performed is plural.

9. The access point of claim 6, wherein when the second message is not received within the preconfigured time, the controller retransmits the first DPP message.

10. The access point of claim 6,
wherein the processor is configured to initiate a security process for the DPP to establish a secured link between the controller and the enrollee when the enrollee onboards to the multiple access point network without using the security process for the DPP and the controller holds information on a bootstrap public key of the enrollee.

11. An operation method of an access point that is an enrollee attempting to enroll in a multiple access point network, the operation method comprising:
receiving, from a multiple access point device, a first DPP message when an enrollee onboards to a multiple access point network by using a DPP; and
transmitting, to the multiple access point device, a second DPP message that is a response the first DPP message,
wherein the second DPP message is transmitted from the multiple access point device to a controller that controls the multiple access point network,
wherein the second DPP message is received by the controller within a preconfigured time,
wherein the first DPP message includes information for a DPP authentication and the first DPP message is generated by the controller,
wherein the first DPP message is transmitted from the controller to the multiple access point device,
when the first DPP message includes information related to a medium access control (MAC) address of the enrollee, a transmission method of the first DPP message is unicast,
when the first DPP message does not include the information related to the MAC address of the enrollee, the transmission method of the first DPP message is broadcast,
wherein the MAC address is obtained by a user equipment (UE) from the enrollee,
wherein the MAC address is transmitted by the UE to the controller.

12. The operation method of claim 11,
wherein the first DPP message includes information related to a channel on which the DPP is performed,
wherein the second DPP message is transmitted on a channel indicated by the information related to the channel.

13. The operation method of claim 12,
wherein the number of the channel on which the DPP is performed is plural.

14. The operation method of claim 11, wherein when the second message is not received by the controller within the preconfigured time, the controller retransmits the first DPP message.

15. The operation method of claim 11, wherein a security process for the DPP to establish a secured link between the controller and the enrollee is initiated by the controller when the enrollee onboards to the multiple access point network without using the security process for the DPP and the controller holds information on a bootstrap public key of the enrollee.

* * * * *